United States Patent [19]

McMonagle, Jr. et al.

[11] Patent Number: 5,475,750
[45] Date of Patent: Dec. 12, 1995

[54] VANDAL-RESISTANT PUSH-BUTTON ACTUATOR

[76] Inventors: John J. McMonagle, Jr., 1369 E. 84th St., Brooklyn, N.Y. 11236; Kevin T. Vesely, 100 Edinburgh Rd., Wallkill, N.Y. 10940

[21] Appl. No.: 223,593

[22] Filed: Apr. 6, 1994

Related U.S. Application Data

[60] Division of Ser. No. 616,998, Nov. 21, 1990, Pat. No. 5,363,436, which is a continuation-in-part of Ser. No. 415,782, Oct. 2, 1989, Pat. No. 5,086,463.

[51] Int. Cl.⁶ .................................................. H04M 1/04
[52] U.S. Cl. ........................... 379/355; 379/354; 379/356; 379/388; 200/341; 200/345
[58] Field of Search .................................. 379/355, 356, 379/354, 353, 57, 40, 45, 388; 200/341, 345, 302, 340

[56] References Cited

U.S. PATENT DOCUMENTS

| | | | |
|---|---|---|---|
| 2,718,931 | 9/1955 | Boudouris | 181/149 |
| 2,829,728 | 4/1958 | Brown | 181/149 |
| 3,009,023 | 11/1961 | Ruth . | |
| 3,213,210 | 10/1965 | Samples | 379/445 |
| 3,328,869 | 7/1967 | Lannert | 29/413 |
| 3,391,256 | 7/1968 | Nawman | 379/451 |
| 3,398,244 | 8/1968 | Ertl et al. | 379/437 |
| 3,707,607 | 12/1972 | Reddick | 379/437 |
| 3,752,927 | 8/1973 | Bartley et al. | 379/451 |
| 3,800,089 | 3/1974 | Reddick | 379/437 |
| 3,846,594 | 11/1974 | Morrell et al. | 379/451 |
| 3,937,913 | 2/1976 | Soulas et al. | 200/345 |
| 3,938,618 | 2/1976 | Ambruoso, Sr. | 181/149 |
| 4,037,067 | 7/1977 | Solomovitz | 379/451 |
| 4,151,380 | 4/1979 | Blomeyer et al. | 379/143 |
| 4,152,564 | 5/1979 | Wirz | 200/345 |
| 4,160,136 | 7/1979 | McGough | 200/345 |
| 4,163,883 | 8/1979 | Boulanger | 200/314 |
| 4,176,254 | 11/1979 | Tuttle et al. | 379/45 |
| 4,246,451 | 1/1981 | Nix | 379/451 |
| 4,254,308 | 3/1981 | Blomeyer et al. | 379/437 |
| 4,267,411 | 5/1981 | Raines | 379/651 |
| 4,396,176 | 8/1983 | Hannula | 379/437 |
| 4,417,113 | 11/1983 | Saito et al. | 200/302 |
| 4,480,163 | 10/1984 | Morris et al. | 200/345 |
| 4,518,826 | 5/1985 | Caudill et al. | 379/437 |
| 4,555,600 | 11/1985 | Morse | 379/451 |
| 4,557,839 | 12/1985 | Tubbs et al. | 252/23 |
| 4,618,860 | 10/1986 | Mori | 340/825.44 |
| 4,724,538 | 2/1988 | Farrell | 379/45 |
| 4,763,349 | 8/1988 | Siegel et al. | 379/38 |
| 4,772,769 | 9/1988 | Shumate | 200/314 |
| 4,778,966 | 10/1988 | Obata et al. | 200/314 |
| 4,788,711 | 11/1988 | Nasco, Jr. | 379/59 |
| 4,794,215 | 12/1988 | Sawada et al. | 200/304 |
| 4,822,963 | 4/1989 | Martin | 200/296 |
| 4,862,499 | 8/1989 | Jekot et al. | 379/451 |
| 4,866,764 | 9/1989 | Barker, III | 379/40 |
| 4,933,968 | 6/1990 | Iggulden | 379/216 |
| 5,097,502 | 3/1992 | Suzuki et al. | 379/356 |

*Primary Examiner*—Jeffrey A. Hofsass
*Assistant Examiner*—Jacques M. Saint-Surin
*Attorney, Agent, or Firm*—Curtis, Morris & Safford

[57] ABSTRACT

A vandal-resistant push-button actuator which may be utilized in a vandal resistant, remotely programmable voice communications unit capable of being programmed for automatically calling predetermined telephone numbers. The vandal-resistant push-button actuator employs a push-button, a push-button mounting device having a passageway therein for slidably receiving the push-button, and first and second axially spaced apart seals between the push-button and the passageway. The seals absorb transverse blows to a raised portion of the push-button and a lubricant may be disposed between the seals to prevent an adhesive inserted by a vandal from disabling the actuator. The raised push-button actuator may be disposed inwardly of an escutcheon and shaped to form a concave, ring-shaped surface therewith, thus to inhibit damage to the inner surface of the escutcheon from a hammer blow.

19 Claims, 15 Drawing Sheets

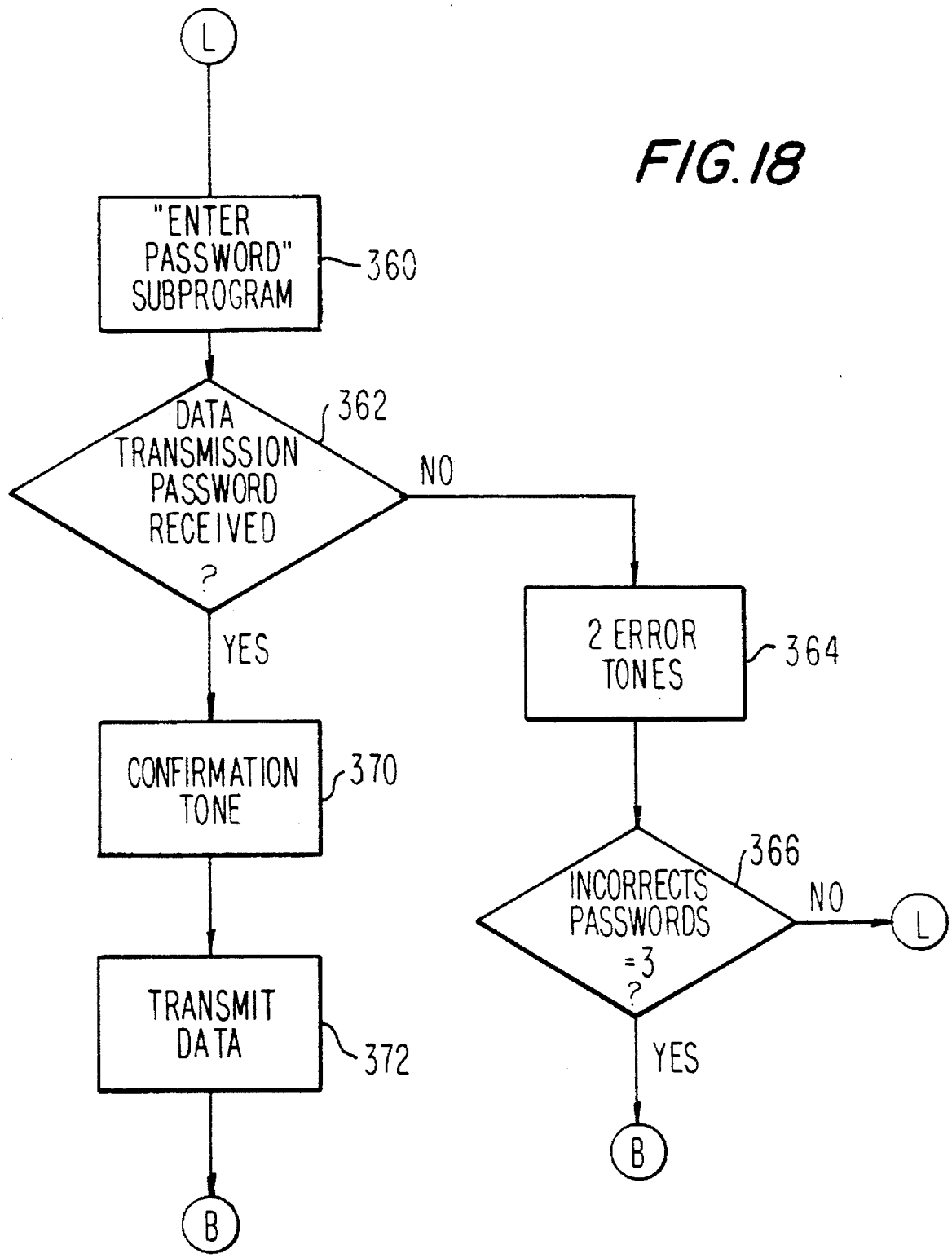

VANDAL-RESISTANT PUSH-BUTTON ACTUATOR

BACKGROUND OF THE INVENTION

This application is a divisional application of U.S. patent application Ser. No. 07/616,998, filed Nov. 21, 1990, U.S. Pat. No. 5,363,436 which, in turn, is a continuation in part of patent application Ser. No. 07/415,782, filed Oct. 2, 1989, U.S. Pat. No. 5,086,463.

A present invention relates to a remotely programmable voice communications unit, as well as vandal-resistant enclosures and subsystems thereof.

A wide range of public communication facilities are required for ensuring the ability to effectively communicate the need for essential services, such as police and a fire service, without delay. Existing emergency communications facilities are designed to provide the ability to communicate between preestablished points and require hardware modification in order to re-route the established communications paths. Such facilities are relatively difficult to install and later modify, as required from time to time. It is, therefore, necessary to employ a centralized receiving unit to achieve the required adaptability and flexibility.

When a call is received by the central unit, it is then necessary to contact the appropriate provider of the emergency service, thus resulting in a delay, resulting in increased danger to life and property. For example, in rural areas, emergency highway communications systems often provide emergency communications services for portions of the highway extending through a number of different municipalities, each of which is responsible to provide essential services for a particular portion of the highway. Calls must be routed through a central unit which, in turn, relays the received information to the appropriate municipal authorities. Automated parking garages must also provide a means of rapidly communicating an emergency call from a patron, for example, for police assistance.

Still other public communications needs exist; for example, oil burner service companies whose customers have large unmanned boiler rooms require prompt notification of service problems. Once a serviceman is dispatched to the customer's facility, it is often necessary for him to call back from the facility in order to have a necessary part delivered to carry the repair. Hotels and car rental agencies also provide customers with dedicated communications lines between their facilities and airports and other transportation centers.

Wherever public accessibility is afforded, however, the equipment is subject to vandalism. Since user operable controls, together with acoustic transmission of verbal communications, must be afforded, mechanical and acoustic interfacing devices are required on the exterior of the communications units. Such devices are particularly vulnerable to damage by vandals. Telephone handsets are frequently ripped off, the cords cut and dials and buttons rendered inoperative such as by inserting various instruments or a strong adhesive between the moving parts of the communications unit. Dialing instructions sometimes are defaced, and in some cases the cover pried loose and the interior components damaged or removed. These problems have necessitated frequent monitoring and maintenance of the individual units and can deprive the public of the ability to obtain emergency services.

SUMMARY

It is, therefore, one object of the present invention to provide remote communications units, together with vandal-resistant enclosures, controls and acoustic interfacing subsystems which overcome the above-described disadvantages of existing communications systems.

It is a further object of the present invention to provide vandal-resistant push-button actuators which are highly resistant to the introduction of foreign substances, such as adhesives, by vandals, and are further protected from damage due to hammer blows and the like.

In accordance with one aspect of the present invention, a vandal-resistant push-button actuator comprises: a push-button defining a push-button axis; a push-button mounting means having a passageway therein for slidably receiving the push-button therein coaxially therewith; and means for forming first and second axially spaced apart, slidable seals between the push-button and the passageway of the push-button mounting means.

In accordance with still another aspect of the present invention, a vandal-resistant push-button actuator comprises: a push-button defining a push-button axis push-button mounting means having a passageway therein for slidably receiving the push-button therein; first resilient means disposed between the push-button and the passageway of the push-button mounting means for resiliently absorbing a force applied to the push-button in a direction transverse to the push-button axis; and second resilient means disposed between the push-button and the passageway spaced apart from the first resilient means for resiliently absorbing a force applied to the push-button in a direction transverse to the push-button axis.

In accordance with a further aspect of the present invention, a vandal-resistant push-button actuator comprises: a push-button; push-button mounting means having a passageway therein for slidably receiving the push-button therein; lubricant disposed between the push-button and the passageway; and means for confining the lubricant between the push-button and the passageway.

In accordance with a still further aspect of the present invention, a vandal-resistant push-button assembly comprises: a sleeve and escutcheon member having a sleeve end extending in a first direction and an escutcheon end extending in a second direction opposite the first direction, the escutcheon end having a generally conical first surface facing in the second direction and a second surface facing in the first direction for abutting an outer surface of a mounting plate; a push-button having a push-button head and a shaft; the sleeve and escutcheon member having a central aperture therethrough extending along an axis thereof, the shaft of the push-button being slidably mounted in the central aperture; the push-button head having a convex outer surface facing in the second direction and extending outwardly of the conical first surface of the escutcheon end; the conical first surface of the escutcheon end forming an angle with a plane transverse to the axis of the sleeve and escutcheon member which is smaller than an angle formed between a tangent to the convex outer surface of the push-button head adjacent the conical first surface of the sleeve and escutcheon member and the plane.

The present invention, as well as further objects and features thereof, will become more fully apparent from the following description of certain preferred embodiments, when read with reference to the accompanied drawings.

BRIEF DESCRIPTION OF THE DRAWINGS

FIG. 18 is a flow chart of a sequence of operations in which the communications station transmits data in response to an incoming call.

DETAILED DESCRIPTION OF CERTAIN EMBODIMENTS

Figure 1:
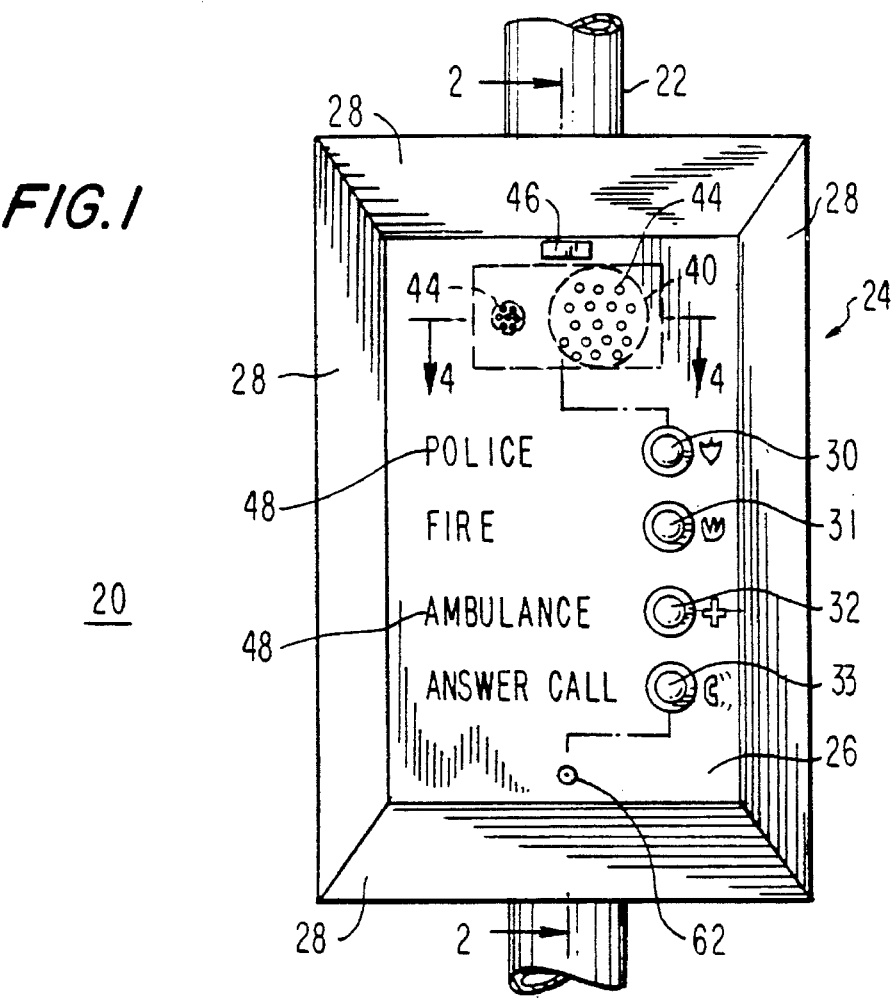
FIG. 1 is a front elevational view of a remotely programmable, vandal-resistant communications station in accordance with one embodiment of the present invention mounted vertically on a light pole.

With reference first to FIG. 1, a vandal-resistant, remotely programmable communications unit capable of providing locally and remotely initiated voice and data communications and monitoring as well as remote control of auxiliary apparatus, is illustrated therein mounted on a light pole 22.

The communications station 20 may be located, for example, in an unattended public parking lot to enable a patron to rapidly contact a police, fire or ambulance services, as needed. Further operational modalities of the unit 20 are described hereinbelow.

The unit 20 includes a face plate enclosure member 24 having a generally rectangular truncated configuration. The enclosure member 24 includes a vertical face 26, as well as four sloping side portions 28. Push-button actuators 30, 31, 32 and 33 are accommodated on the vertical face 26.

Mounted within the upper portion of the unit 20 is a speakerphone assembly including a speaker 40 and a microphone 42 indicated by phantom lines and positioned behind a series of apertures 44 formed in the upper portion of the vertical face 26. Speaker 40 is provided with a plastic film cone which may be, for example, Mylar plastic film. Apertures 44 preferably are arranged on the vertical face 26 in a generally rectangular or oval configuration covering both the speaker 40 and the microphone 42 so that vandals cannot determine the precise location of either the speaker 40 or microphone 42 therefrom. Positioned above the apertures 44 on the vertical face 26 is a stainless steel tag 46 adhesively affixed thereto and bearing engraved indicia identifying the unit 20 by an appropriate combination of letters and numbers.

In use for carrying out voice communications, a person at the communications unit 20 depresses a selected one of the push-button actuators 30, 31 and 32 in order to contact emergency service personnel. The vertical face 26 is provide with engraved indicia 48 each adjacent to a corresponding push-button actuator for indicating the respective emergency service which is automatically contacted thereby. In the illustrated embodiment, the actuator 30 is used to contact the police, the actuator 31 is used to contact the fire department and the actuator 32 is used to call for an ambulance. When the respective actuator is depressed and held by the user, the unit 20 which is connected with the public telephone system automatically transmits a preprogrammed telephone number through the system to directly contact the desired emergency service. In addition, authorized personnel in possession of a preprogrammed password are enabled to directly contact the unit 20 via the public telephone system from any touch tone telephone. When such an incoming call is received by the unit 20, the speaker 40 emits a synthesized ring signal. To answer the call, a person in the vicinity of the unit 20 need only depress the actuator 33 and speak. The operation of the communications unit 20 in carrying out voice communications is explained in greater detail hereinbelow.

Figure 2:
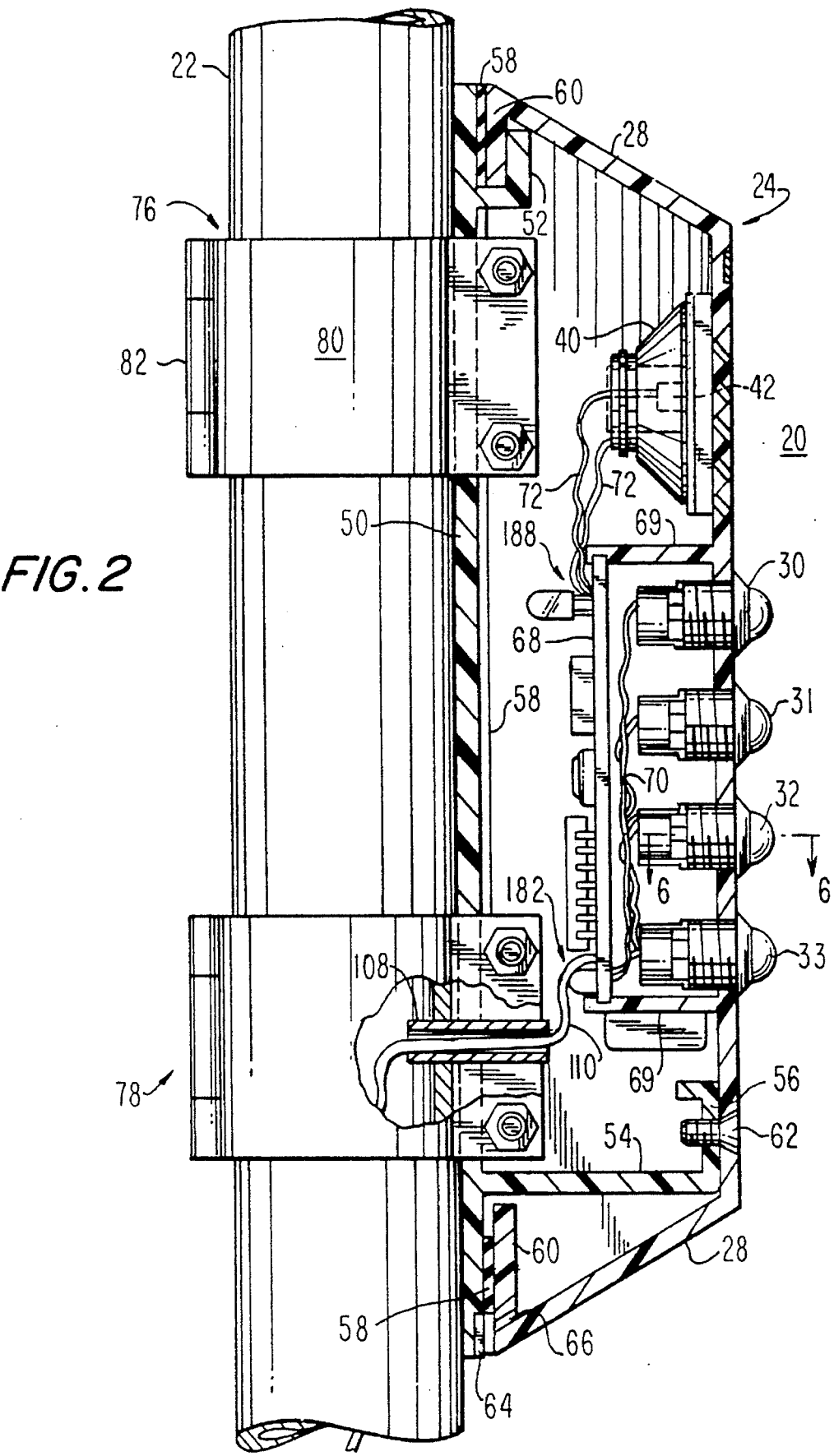
FIG. 2 is a partially sectional view of the communications station of FIG. 1 take it along the lines 2—2 therein.

With reference also to FIG. 2, the unit 20 includes a back plate 50 which is rectangular in shape and dimensioned to extend to outer edges of the sloping side portions 28 of the face plate and enclosure member 24. The back plate 50 is provided with an upper offset lip 52 and a lower bracket 54 including an outwardly facing lower ledge 56. In order to create a water-tight seal between the face plate enclosure member 24 and the back plate 50, a gasket 58 is arranged about the periphery of an inner surface of the back plate 50 facing the enclosure member 24 and the enclosure member 24 is provided with inwardly projecting surfaces 60 extending inwardly from the outer edges of its sloping side portions 28, so that when the enclosure member 24 is affixed against the back plate 50, the surfaces 60 press against the gasket 58 to form a water-tight seal. To join the face plate enclosure member 24 to the back plate 50, the upper surface 60 is inserted behind the offset lip 52, and the lower portion of the enclosure member 24 is placed over the ledge 56. A single tamper-proof screw 62 affixes a lower portion of the face plate enclosure member 24 to the lower ledge 56 to securely hold the enclosure member 24 to the back plate 50.

The back plate 50 is provided with a milled slot 64 extending from a central portion of a lower edge thereof upwardly a short distance within an inner surface of the back plate 50 and a corresponding notch is provided in the gasket 58, thus to expose an outer surface of a lower one of the inwardly projecting surfaces 60 of the enclosure member 24. One or more weep holds 66 is formed in the lower one of the inwardly projecting surfaces 60 adjacent a lowermost portion thereof and aligned with the milled slot 64 and the notch in the gasket 58, so that liquids which accumulate within the enclosure may be drained outwardly thereof through the weep holes 66 and the space formed by the milled slots 64 and the notch formed in the gasket 58.

An electronic circuit board 68 supports and interconnects a number of electronic components, described in greater detail below, which receive and transmit both voice and dual tone multi-frequency (DTMF) signals via a public telephone system, store data and user passwords in memory, decode DTMF signals received by the unit and control the overall operation thereof. The circuit board 68 is mounted to the face plate enclosure member by a plurality of stand-offs 69 thereof. The circuit board 68 is appropriately coupled through conductors 70 with the push-button actuators 30–33 as well as through conductors 72 with the speaker 40 and the microphone 42.

Figure 3:
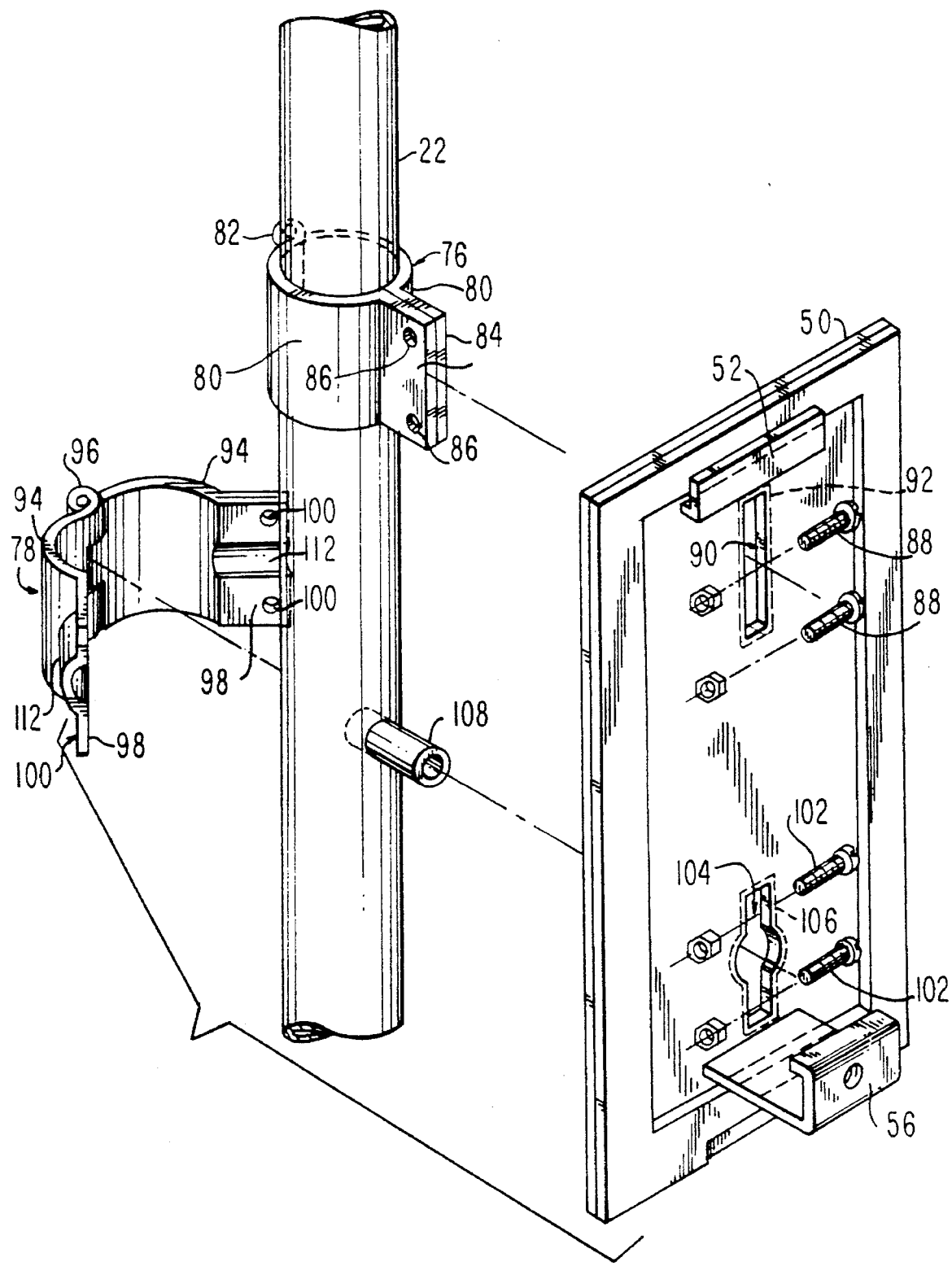
FIG. 3 is an exploded view of vandal-resistant clamping devices for affixing the communications station of FIGS. 1 and 2 to a light pole.

With reference also to FIG. 3, the unit 20 is affixed to light pole 22 by means of respective upper and lower clamping members 76 and 78. Clamping member 76 is provided with first and second halves each having respective semi-circular portions 80 joined by a hinge 82 at one of the semi-circular extremities thereof to permit the semi-circular portions 80 to rotate thereon. Each of the clamp halves is also provided with a respective flat projecting portion 84 extending radially outwardly from a second semi-circular extremity of the semi-circular portion 80 so that the projecting portions 84 may be brought together by rotating the semi-circular portions 80 on the hinge 82. Each of the projecting portions 84 is provided with a respective pair of apertures 86, each of which is positioned to correspond with a respective aperture of the opposing projecting portion 84 when the portions are brought together, in order to permit a fastener in the form of a bolt 88 to be inserted therethrough for securely maintaining the clamp halves together about the light pole 22.

In accordance with one advantageous feature of the disclosed embodiment, the projecting portions joined together are inserted through a respective aperture 90 formed in the back plate 50 of the unit 20 such that the bolts 88 are disposed within the enclosure defined by the back plate 50 and the face plate enclosure member 24. It will be appreciated, therefore, that the bolts 88 are thereby protected within the enclosure from tampering by vandals. It is, nevertheless, easy to install the unit 20 on the clamping member 76 by first assembling the clamping member 76 about the light pole 22, positioning the aperture 90 of the back plate 50 over the projecting portions 84 of clamping member 76 and affixing the bolts 88 thereto before positioning the face plate enclosure member against the back plate 50, as described hereinabove. In order to form a weather-tight seal between the projecting portions 84 of the clamping members 76 and the back plate, a sealing boot 92 (shown in phantom lines for ease of presentation) is arranged about the periphery of the aperture 90 form a seal with the projecting portions 84.

Similarly to the upper clamping member 76, the lower clamping member 78 is provided with a pair of semi-circular portions 94 each joined at one semi-circular extremity thereof to the other by a hinge 96 and having respective projecting portions 98 extending from opposite semi-circular extremities thereof. Like the projecting portions 84, the portions 98 are provided with a pair of corresponding apertures 100 to permit respective bolts 102 to be positioned therethrough for fastening the projecting portions 98 securely together to affix the lower clamping member 78 about the light pole 22.

The back plate 50 is provided with a corresponding aperture 104 therethrough permitting the projecting portions 98 of the lower clamping member 78 to fit therein in order to position bolts 102 within the enclosure defined by the back plate 50 and the face plate enclosure member 24 to shield them against tampering by vandals. A sealing boot 106 (shown in phantom lines for ease of presentation) arranged about the periphery of the aperture 104 provides a weather-tight seal between the projecting portions 98 and the aperture 104. A conduit 108 extends from within the light pole 22 outwardly thereof to a point within the enclosure formed between the enclosure member 24 and the back plate 50 to provide an enclosed passageway between the light pole 22 and the unit 20 in order to admit a telephone wire 110 (refer to FIG. 2) from the interior of the light pole 22 into the interior of the unit 20 wherein it is affixed to the circuit board 68 in order to couple the unit with a public telephone system. The conduit 108 is positioned between respective semi-circular portions 112 in the projecting portions 98 of the lower clamping member 78 and extending radially therealong. Accordingly, the conduit 108 is protected from tampering by vandals by the semi-circular portions 112 of the projecting portions 98. The conduit 108 serves the further purpose of anchoring the unit 20 both axially and radially with respect to the light pole 22 so that relative movement therebetween is prevented, thus protecting the telephone wire 110 from damage.

Figure 4:
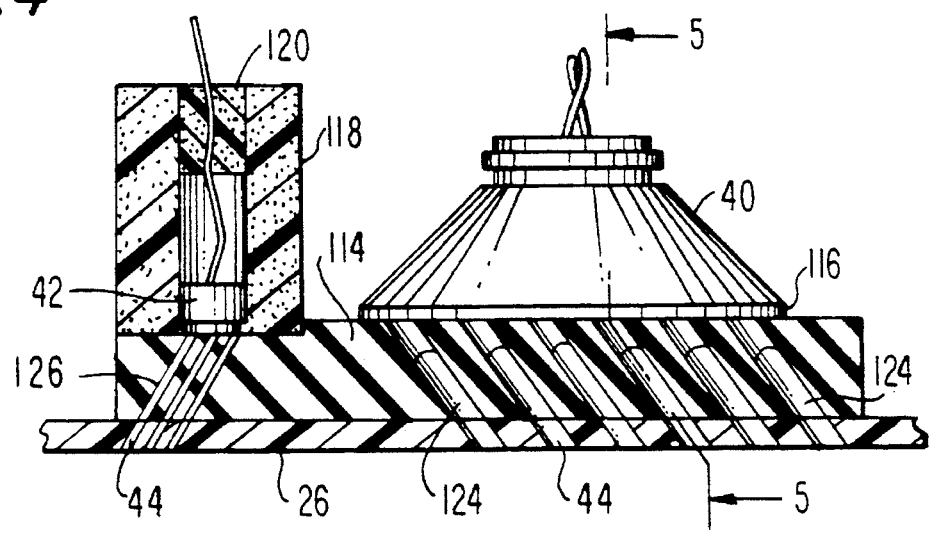
FIG. 4 is a sectional view of a vandal-resistant and feedback suppressing baffle for mounting a speaker and a microphone of the vandal-resistant communications station of FIGS. 1–3 taken generally along the lines 4—4 in FIG. 1.
Figure 5:
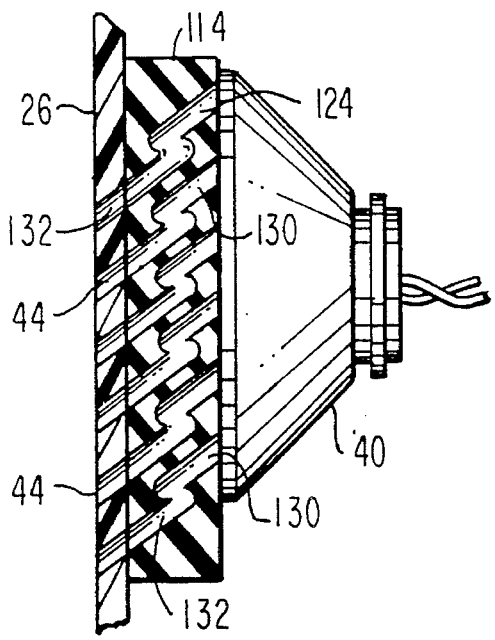
FIG. 5 is a sectional view of the speaker and microphone baffle taken along the lines 5—5 in FIG. 4.

With reference now to FIGS. 4 and 5, the speaker 40 and the microphone 42 are securely mounted with respect to an inner surface of a baffle 114 having an opposing surface affixed with an inner surface of the vertical face 26 of the face plate enclosure member 24. A layer of foam material 116 is disposed between the speaker 40 and baffle 114 to inhibit the transmission of sound from the speaker 40 directly to the material of the baffle 114. The microphone is carried by a generally cylindrical foam member 118 within a cylindrical aperture therethrough closed at an inner end thereof by a foam plug 120. The microphone 42 is spaced a slight distance from the material of the baffle 114, either by recessing the microphone 42 within the cylindrical aperture of the foam cylinder 118 or by milling a depression in the surface of the baffle 114. By the provision of the foam layer 116 between the speaker 40 and the baffle 114 and the provision of a space between the microphone 42 and the baffle 114, the direct transmission of sound waves from the speaker to the microphone through the material of the baffle 114 is suppressed. Moreover, by disposing the microphone 42 within the foam cylinder 118 and disposing the plug 120 at the inner portion of the aperture therein, sound transmission between the speaker 40 and the microphone 42 within the enclosure of the unit 20 is likewise suppressed.

In accordance with further advantageous features of the present embodiment, the baffle 114 is provided with respective first and second pluralities of offset and diverging apertures 124 and 126 for respectively permitting sound transmission from the speaker 40 to the exterior of the unit 20 and from the exterior thereof to the microphone 42. With reference especially to FIG. 5, it will be seen that each of the offset apertures 124 includes a first aperture 130 extending from the inner wall of the baffle 114 adjacent to speaker 40 and terminating within the baffle 114, and a second aperture 132 corresponding with the first aperture 130 and extending from the outwardly facing surface of the baffle 114 inwardly thereof and terminating therein. The corresponding apertures 130 and 132 extend generally parallel to one another and are offset slightly so that they intersect in offset relation thus to provide a deviated passageway through the baffle 114 from the speaker 40 outwardly to the vertical face 26. The apertures 44 in the vertical face 26 are each aligned with a respective one of the offset apertures 124 and 126 in the baffle 114. It will be appreciated that the provision of deviated passageways through the baffle 114 in the form of apertures 124 greatly inhibits the introduction of a sharp pointed object therethrough by a vandal intending to damage the speaker 40. It will be seen also from FIG. 5 that the apertures 124 as well as the apertures 44 slope downwardly from the speaker to the exterior of the unit thus to inhibit the transmission of rainwater from the exterior of the unit inwardly to the speaker 40, as well as to drain any liquids which a vandal may attempt to introduce through the apertures 44 and 124 to damage the speaker 40. Apertures 126 are similarly constructed, so that they likewise each include first and second offset apertures providing a deviated passageway and slope downwardly from the interior of baffle 114 toward its outer surface.

With reference again to FIG. 4, it will be seen that the apertures 124 are also formed in the baffle 114 so that they deviate outwardly with respect to the center of the baffle 114 and the unit 20 when viewed from above so that sound produced by the speaker 40 is projected outwardly of the unit 20 in a direction away from the apertures 126 which admit sound from the exterior of the unit to the microphone 42. Similarly, the apertures 126 when viewed from above deviate in an opposing direction from the center of the baffle 114 and the unit 20 outwardly thereof. Accordingly, sound from the speaker 40 projected outwardly of the unit 20 is denied a direct path to the microphone 42, but rather undergoes multiple reflections within the passageways 126 and consequent attenuation before reaching the microphone 42. It will be seen, therefore, that the mutually deviating sets of apertures 124 and 126 serve to suppress feedback between the speaker 40 and the microphone 42, thus to facilitate full duplex voice communications via the unit 20, that is, permitting the parties communicating both to transmit simultaneously without objectionable interference due to acoustic feedback between the speaker 40 and the microphone 42.

Figure 6:
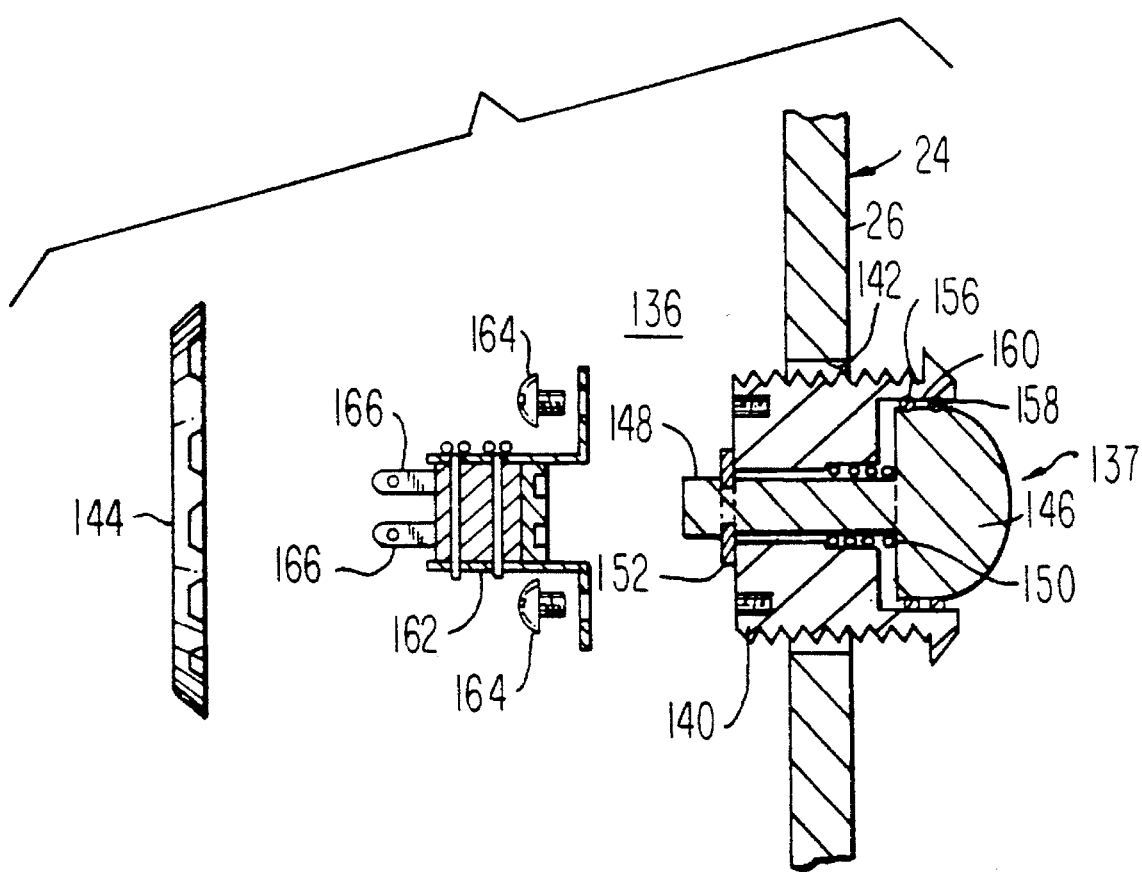
FIG. 6 is a sectional view of a vandal-resistant push-button switch actuator taken along the lines 6—6 in FIG. 2.

With reference now to FIG. 6, each of the push-button actuators 30, 31, 32 and 33 is incorporated in an identically constructed vandal-resistant, push-button actuator assembly illustrated as the assembly 136. The assembly 136 includes a threaded sleeve and escutcheon member 140 fitting closely within a corresponding aperture 142 in the vertical face 26 and held in place by a locking gasket 144 on the inside surface of the vertical face 26. A push-button 137 of one-piece construction is reciprocally supported within a central aperture of the sleeve and escutcheon member 140. The push-button 137 includes a push-button head 146 having a convex outer surface extending outwardly of the sleeve and escutcheon member 140 on the exterior of the unit 20 thus to provide a raised surface so that the head 146 is more easily located by visually handicapped persons. The head 146 extends inwardly of the central aperture to a generally planar inner surface thereof opposing an outwardly facing surface of the central aperture which acts as a stop preventing further inner motion of the push-button 137 with respect to the sleeve and escutcheon member 140. The push-button 137 includes a shaft portion 148 extending inwardly from the planar inner surface of the head 146 to an inner extremity extending beyond an inner surface of the sleeve and escutcheon member 140. The push-button 137 is biased outwardly of the sleeve and escutcheon member 140 by a coil spring 150 which presses between an inner shoulder of the sleeve and escutcheon member 140 and the planar inner surface of the head 146. A snap-ring 152 is fitted in a groove adjacent the inner extent of the shaft portion 148 and abuts the inner surface of the sleeve and escutcheon member 140 thus to prevent further outward movement thereof from the member 140 thus to retain the push-button 137 therein.

Respective inner and outer O-rings 156 and 158 are disposed in corresponding circumferential grooves in an outer, generally cylindrical surface of the head 146 and press against an inner surface of the central aperture of the member 140 so that the O-rings 156 and 158 are carried by the push-button 137 as it moves reciprocally in the central aperture thus to provide first and second axially spaced apart, slidable seals between the push-button 137 and the central aperture of the member 140. The O-rings 156 and 158 are preferably constructed of polytetrafluoroethylene (such as that sold under the trademark Teflon), but may also comprise any appropriately resilient material forming a fluid-tight seal between the push-button head 146 and the central aperture of the member 140.

A layer 160 of synthetic grease is applied between the O-rings 156 and 158 which serves both to lubricate the O-rings 156 and 158 and to inhibit the formation of an adhesive bond between the head 146 of the push-button 137 and the member 140. Accordingly, even if it is possible for a vandal to inject an adhesive substance past the outer 0-ring 158, the presence of the synthetic grease on the surfaces of the head 146 and the central aperture of the member 140 prevents the adhesive from bonding to the surfaces, thus rendering it extremely difficult to disable the push-button actuator 136 in this fashion. An appropriate synthetic grease is sold under the trademark SuperLube marketed by Synco Chemical Corp., Bohemia, N.Y. Appropriate synthetic grease compositions are disclosed in U.S. Pat. No. 4,396,514 issued Aug. 2, 1983. Other suitable types of synthetic greases and oils are disclosed in U.S. Pat. No. 4,396,514. It will be appreciated that various types of natural greases and oils as well as other lubricating substances will serve to lubricate the seals formed by the O-rings 156 and 158 and/or inhibit the formation of an adhesive bond between the push-button head 146 and the member 140. It will also be appreciated that the O-rings 156 and 158 may be retained in grooves formed on the surface of the central aperture of the member 140.

The assembly 136 is also provided with a double-pole microswitch 162. The switch 162 is secured to the member 140 by screws 164 and includes a plurality of switch terminals 166 for communicating the electrical state of the switch to the electronic control circuitry of the unit, which state will change both upon depression of the push-button 137 and release thereof to appropriately control the operational state of the unit 20.

Figure 7:
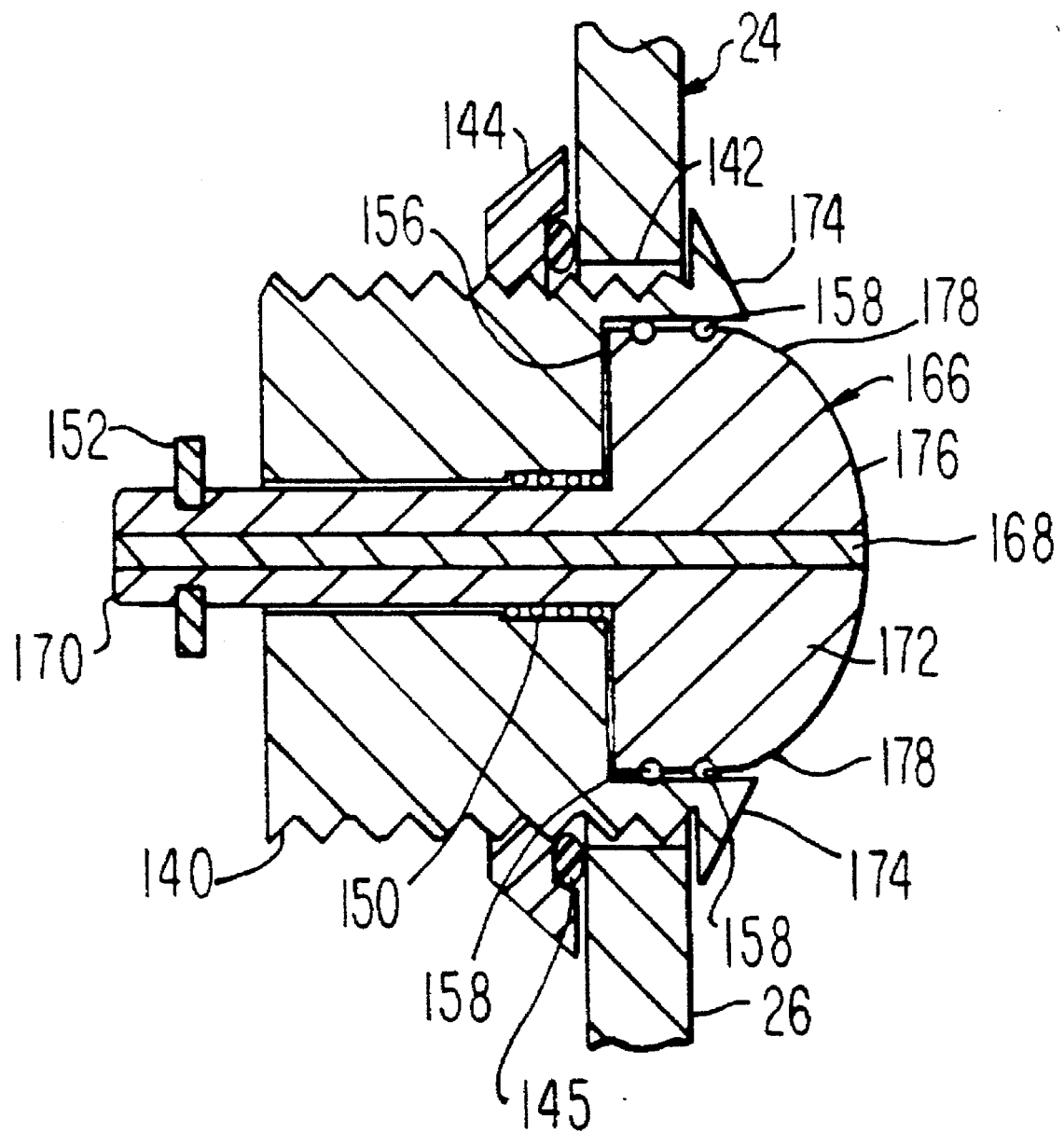
FIG. 7 is a sectional view of a further embodiment of certain components of a vandal-resistant push button switch actuator adapted for use in the communications station of FIGS. 1 and 2.

With reference also to FIG. 7, a modified form of push-button 166 is illustrated therein having a central aperture in which a light pipe 168, such as an optical fiber, is disposed and extends from the inner extremity of a shaft portion 170 of the modified button 166 to a convex outer surface of a head portion 172 of the push-button 166. The light pipe 168 is adapted to conduct light produced in the interior of the enclosure formed by the enclosure member 24 and the back plate 50 for illuminating the outer surface of the push-button 166, thus to facilitate finding the push-button in a darkened location.

The sleeve and escutcheon member 140 in FIG. 7 is shown to include an escutcheon portion 174 forming a generally conically-shaped outer surface extending at a first, relatively shallow angle with respect to a plane defined by the outer surface of the vertical face 26 and transverse to the axis of the push-button 166. The outer surface of the escutcheon portion 174 extends from a lateral extremity of the head portion 172 outwardly and rearwardly to the outer surface of the vertical face 26. Push-button 166 is shown in FIG. 7 in a fully depressed condition. The convex outer surface of the head portion 172 includes a radially inner surface 176 lying on a spherical surface having a relatively large radius. The convex outer surface of the head portion 172 also includes a radially outer surface 178 extending outwardly from the radially inward surface 176 to a radial position adjacent an inner extremity of the outer surface of the escutcheon portion 174. The radially outer surface 178 lies on a surface of a sphere defined by a relatively smaller radius than that defining the radially inner surface 176. A tangent to the radially outer surface 178 at the outer extremity thereof defines an acute angle with the plane of the vertical face 26 which is relatively larger than that defined by the outer surface of the escutcheon portion 174 and the plane of the vertical face 26. It will be appreciated, therefore, that the radially outer surface 178 of the push-button 166 and the outer-surface of the escutcheon portion 174 together define a concave surface rendering it difficult for a vandal to strike a hammerblow against the inner extremity of the escutcheon portion 174 for the purpose of damaging the same by deforming it inwardly to prevent operation of the push-button 166. Moreover, the relatively greater radius describing the radially inner surface 176 of the convex outer surface of the push-button 166 reduces the outer extent thereof from the escutcheon portion 174, thus to reduce any moment produced by a hammerblow by reducing the length of the arm through which the moment acts and by increasing the angle at which the hammer strikes the push-button when the hammer is swung transversely thereto.

As in the case of the embodiment of FIG. 6, the 0-ring seals 156 and 158 are carried by grooves in the circumferential outer surface of the head portion 172 in axially spaced apart relation and are formed of a resilient substance. Accordingly, it will be appreciated that a hammerblow against the convex outer surface of the head portion will tend to rotate the push-button 166 about a portion of the outer 0-ring seal 158, such that a portion of the inner 0-ring seal 156 absorbs the moment thus produced. In this fashion, the spaced-apart 0-ring seals 156 and 158 are operative to absorb forces transverse to the push-button axis and to thereby reduce internal damage to the push-button 166 and the member 140 from a hammer blow which may tend to damage the unit.

The locking gasket 144 is illustrated in FIG. 7 in cross-section. It will be seen therefrom that the locking gasket 144 includes a further 0-ring seal 145 which serves to provide a fluid-tight seal between the aperture 142 of the vertical face 26 and the sleeve and escutcheon member 140, so that the interior of the unit 20 is further protected against the weather and attempts by vandals to introduce liquids to the interior of the unit.

Figure 8:
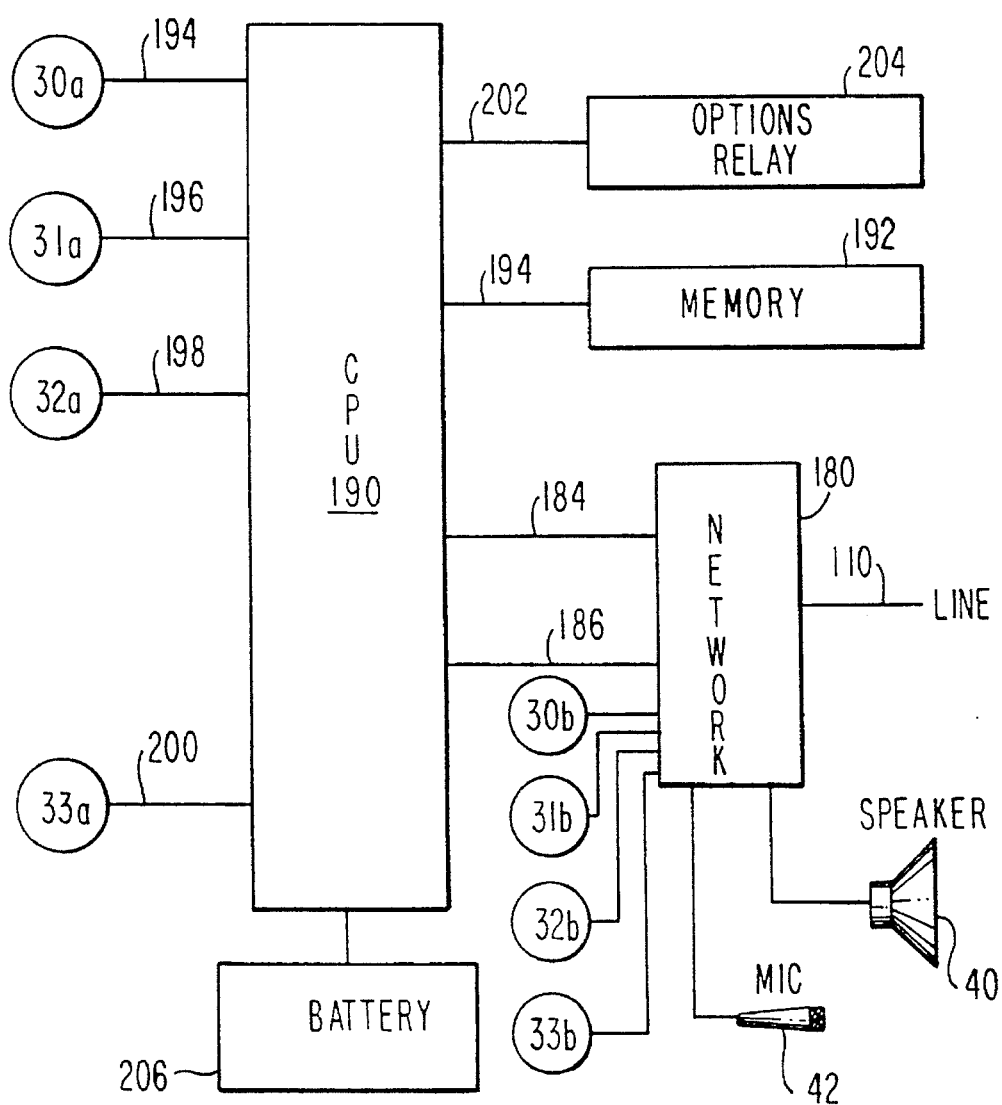
FIG. 8 is a block diagram of electronic control and communications circuitry incorporated in the communications station of FIGS. 1 and 2.

With reference now to FIG. 8, the electronic circuitry of the remotely programmable voice communications unit 20 is illustrated therein in block form. The circuit of FIG. 8 includes an input/output network 180 coupled with the telephone line 110 (see also FIG. 2) and operative to transmit and receive signals to and from a public telephone system, such as the North American Telephone Exchange, via a two wire tip/ring interface in the form of an RJ-14 connector mounted on the circuit board 68. The connections provided by the tip/ring interface are repeated on a terminal strip mounted on the circuit board 68. The tip/ring interface and terminal strip are collectively indicated by the reference numeral 182 in FIG. 2.

The input/output network 180 includes conventional switching circuitry for coupling the unit 20 with the telephone line 110 to controllably establish an Off-Hook condition thereof and to controllably reestablish an On-Hook condition. Upon depression of one of the push-button actuators 30, 31 or 32 a corresponding pole thereof, 30b, 31b or 32b, closes to establish an Off-Hook condition for applying power to the unit 20 from the line 110. Similarly, upon receipt of a ring signal from the line 110, the conventional switching circuitry responds by establishing the Off-Hook condition also to apply power to the unit 20 from line 110.

Network 180 also includes conventional circuitry for controllably producing dual tone multifrequency (DTMF) tones corresponding with a binary code supplied to a control input 184 of the input/output network 180. The conventional circuitry of the input/output network 180 also serves to decode DTMF tones received from the telephone line 110 in order to convert the same to binary data which it supplies to a data output 186 of the input/output network 180. In addition, such conventional circuitry senses the presence of a ring signal on the line 110 which it encodes in binary form and supplies to its data output 186. Moreover, the conventional circuitry also serves to transmit and receive voice signals from the microphone 42 and supplied to speaker 40, respectively, via the telephone line 110, as well as to generate a synthetic ring signal in response to a control signal and supply the same to the speaker 40. The foregoing functions are advantageously implemented with the use of a type MC34010 full duplex integrated circuit.

With reference also to FIG. 2, the speaker 40 and the microphone 42 are conductively coupled with the circuit board 68 via a further terminal strip indicated generally at 188 to which the input/output network 180 is connected for coupling the speaker 40 and the microphone 42 to appropriate impedance matching circuitry for matching the same with the voice transmit/receive circuitry implemented by the MC 34010 integrated circuit.

Overall control of the operations carried out by the communications unit 20 is exercised by a central processing unit (CPU 190) including a microprocessor unit which serves to supply appropriate control signals, described in greater detail below, in accordance with a program stored in a read only memory (ROM) and to erasably store necessary data such as passwords and operational data in a non-volatile fashion in an electrically erasable programmable read only memory (EEPROM). The read only memory and EEPROM are collectively represented by the memory block 192 in FIG. 8. Address and data buses established between the memory block 192 and the central processing unit 190 are indicated generally by a line 194.

The central processing unit 190 has a data input bus coupled with the data output 186 of the network 180 to receive the binary coded information received by the network 180 from the line 110 as DTMF tones, together with further input data including binary coded ring signals. The central processing unit 190 has a control signal output coupled with the control input 184 of the input/output network 180 to supply control signals thereto to control the generation of DTMF signals thereby for transmission over the telephone line 110, as well as to controllably establish an On-Hook state and to exercise further operational controls, as described in greater detail below. The central processing unit 190 is further provided with separate data inputs 194, 196, 198 and 200 coupled respectively with poles 30*a*, 31*a*, 32*a* and 33*a* of the push-button actuators 30, 31, 32 and 33 for sensing the operational state thereof. Central processing unit 190 includes a further control signal output 202 coupled with an input of an options relay 204 for controlling the operation of auxiliary equipment, as explained in greater detail hereinbelow. Power for the operation of the electronic circuitry is obtained from the telephone line in an Off-Hook condition via a DC to DC converter incorporated in the network 180. In order to supply power for operating the options relay, however, a battery 206 is supplied which is controllably coupled through the central processing unit 190 thereto. Central processing unit 190 is further operative to sense a low-voltage condition of the battery 206 and produce a low-battery signal in response thereto for transmission automatically to a remote receiving device via the telephone line 110, as described in greater detail hereinbelow. In the alternative, power for the operation of the electronic circuitry incorporated in the unit 20 may be supplied by an AC/DC converter connected with a power line.

Figure 9:
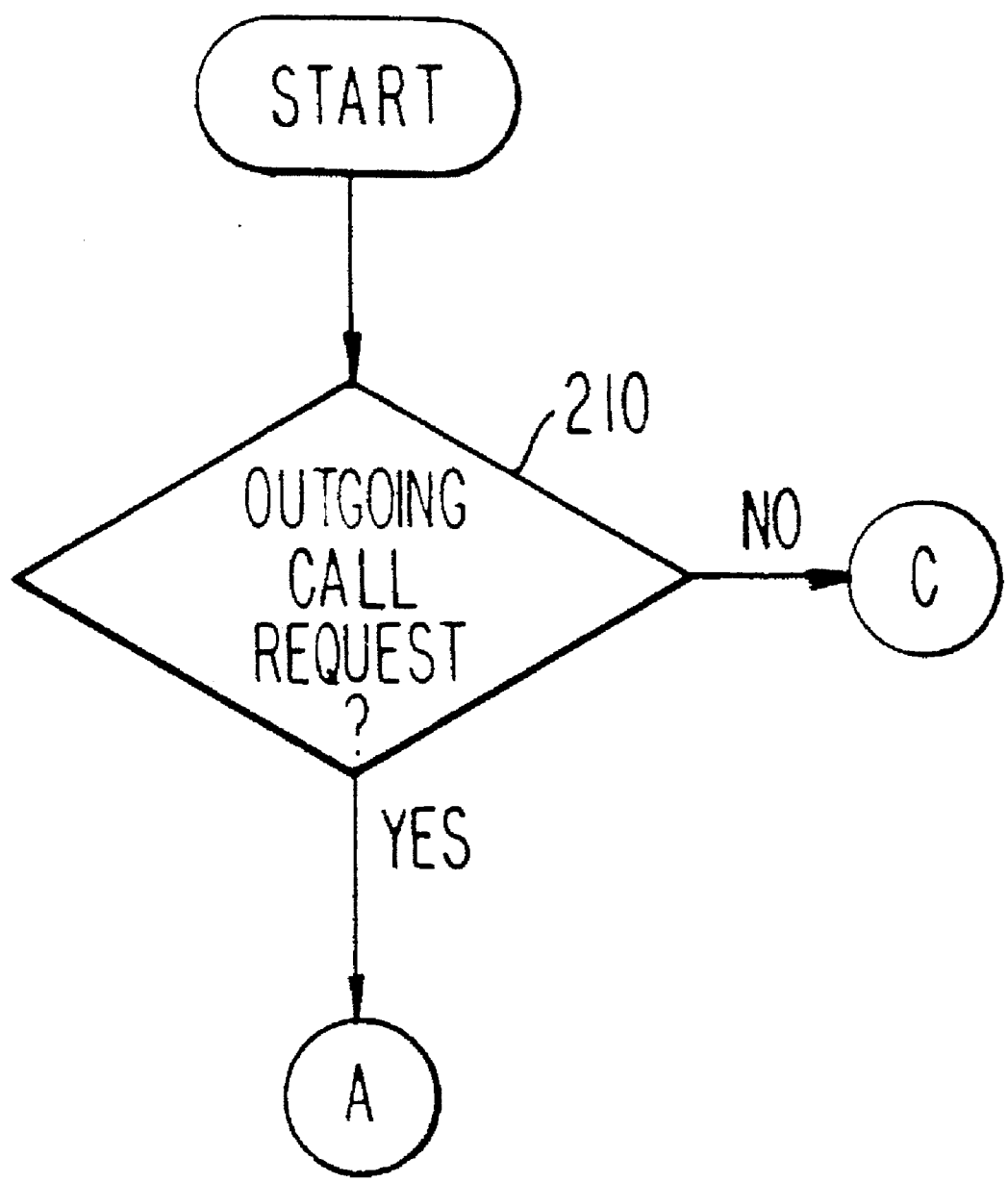
FIG. 9 is a flow chart illustrating a sequence of operations of the communication station in a power-up mode.
Figure 10:
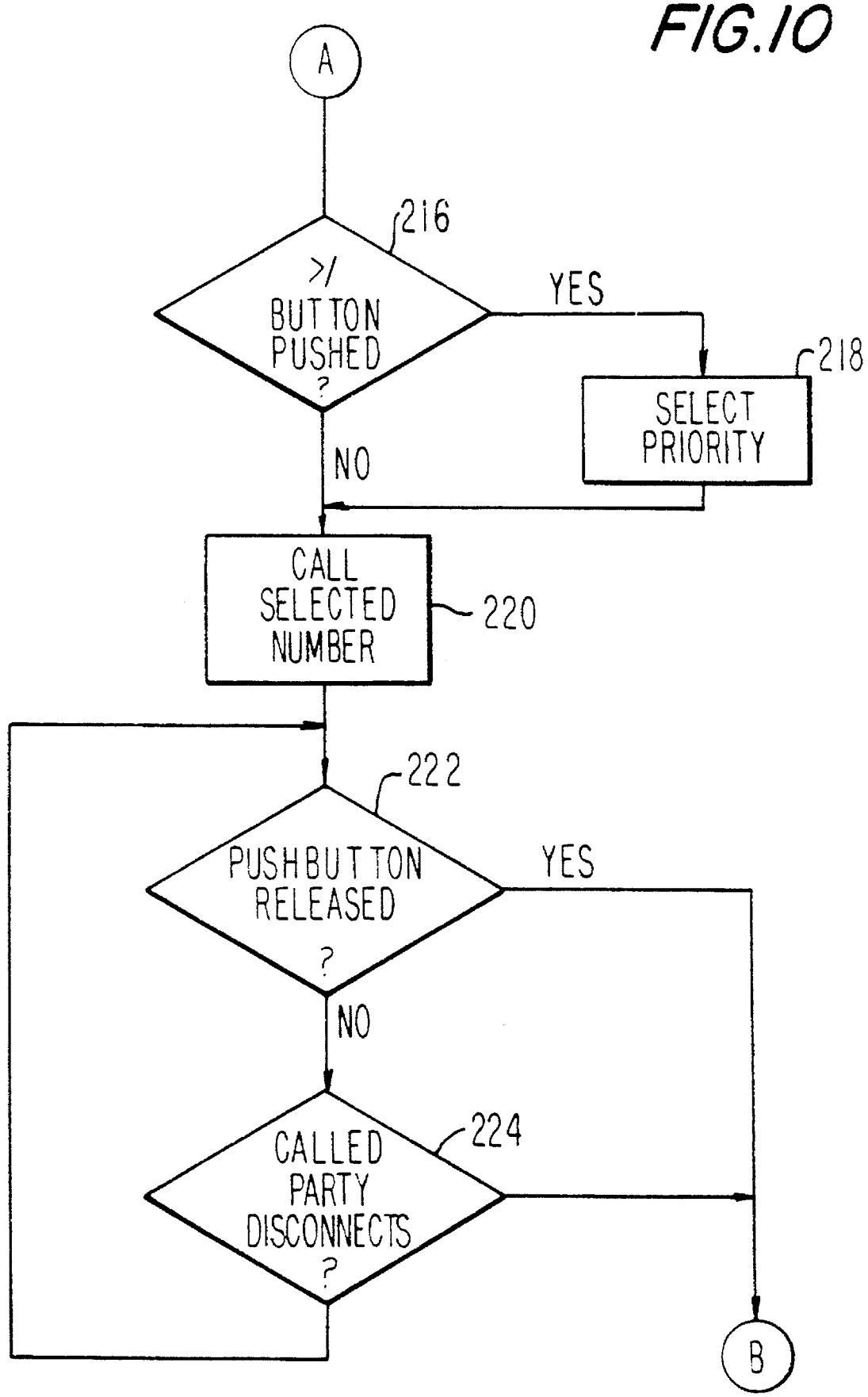
FIG. 10 is a flow chart of a sequence of operations of the communications station when a user places an outgoing call.

The sequence of operations carried out by the unit 20 under the control of the central processing unit 190 in accordance with the instructions stored in the read only memory of the memory block 192 is described hereinbelow in connection with FIGS. 9–18. Referring first to FIG. 9, in a power-up mode illustrated therein, upon the receipt of a ring signal from the line 110 or the actuation of one of push-button actuators 30, 31 or 32, power is drawn from the line 110 via the network 180 and the central processing unit 190 begins operation by polling its data inputs 194, 196 and 198, as indicated by step 210 in FIG. 9, to determine if an outgoing call request has been entered by a user's actuation of one of push-button actuators 30, 31 or 32, respectively. If so, the program branches to an outgoing call mode, illustrated in FIG. 10. As illustrated in FIG. 10, in the outgoing call mode, the unit 190 first determines whether more than one of the pushbutton actuators 30, 31 and 32 is pushed by the user, as indicated in step 216. In that event, to resolve the ambiguity of the user's request, the unit 190 automatically assigns priority to a request indicated by one of the push-button actuators, as indicated in step 218. Whether or not more than one button has been pushed, therefore, the selected call request causes the central processing unit 190 to address a predetermined location in the EEPROM of the memory block 192 to read telephone number data therefrom previously stored in a programming mode, as explained hereinbelow. The telephone number data read by the unit 190 from the EEPROM is supplied by the unit 190 to the control input 184 of the input/output network 180 in order to cause the network to transmit a series of DTMF tones over telephone line 110 in order to call the location indicated by the stored telephone number data, as indicated in step 220. It will be appreciated that substantial delay is avoided in this fashion, since the user need only press and hold the appropriate push-button actuator in order to generate an emergency call.

Figure 11:
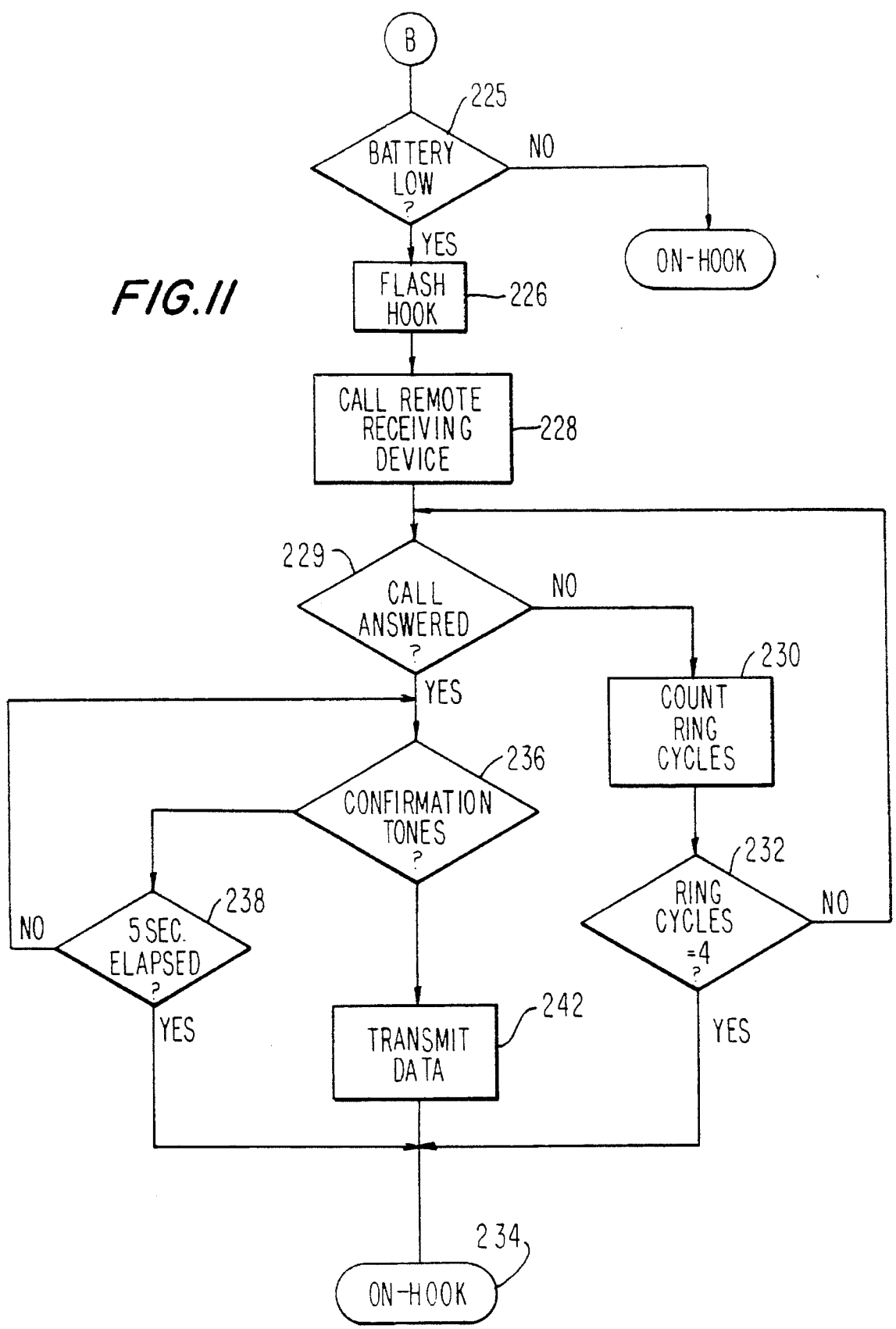
FIG. 11 is a flow chart of a sequence of operations when the communications station automatically transmits operational data to a remote receiver.

Once the unit 190 has supplied the telephone number data to the network 180, it repeatedly monitors both the state of the push-button actuators 30, 31 and 32 (step 222) to determine whether the push-button has been released, and the data received via the data output 186 of the network 180 to determine whether a signal has been generated thereby indicating that the called party has disconnected to terminate the call (step 224). So long as neither event has occurred, the unit 190 maintains the Off-Hook condition while repeatedly polling its inputs 194, 196 and 198, as well as the data output 186 of the network 180 to determine whether either the push-button has been released or the called party has disconnected. When either of these events occurs, the program automatically branches to a battery monitoring mode illustrated in FIG. 11. As indicated in FIG. 11, in the battery monitoring mode of operation, in step 225 the unit 190 determines whether the voltage supplied by the battery 206 is low. If not, an On-Hook condition is established and power is thus removed from the circuit which will remain in this power-down condition until an incoming or outgoing call request is later received, as explained above in connection with FIG. 9. If the battery voltage is low, however, the unit 190 causes the network 180 to emit a "flash hook" signal to the line 110 to obtain a dial tone, as indicated in step 226.

The unit 190 then proceeds to read prestored telephone number data from the EEPROM of the memory block 192 and supplies the same to the network 180, causing the same to transmit the corresponding DTMF tones over the telephone line 110, as indicated in step 228. Thereafter, as indicated in step 229, the unit 190 monitors the data supplied by the network 180 to determine whether the call has been answered. In the event that the call has not yet been answered, the program continues by determining how many ring cycles have been completed, as indicated in step 230, and if the number thereof is less than 4, as indicated in step 232, the unit 190 continues by again monitoring the data output from the network 180 to determine whether the call has been answered. In the event that 4 ring cycles have been completed without the call having been answered the unit 190 outputs a signal to the network 180 to reestablish the On-Hook condition, as indicated in step 234 and the circuit is powered-down.

In the event, however, that the call is answered in less than four ring cycles the program branches from the step 229 of FIG. 11 to step 236 thereof, whereupon the unit 190 checks the data output by the network 180 to determine whether the confirmation tones have been received which indicate that a proper connection has been achieved. In the event that the confirmation tones are not received within 5 seconds, as indicated by step 238, the unit 190 proceeds to reestablish an On-Hook condition as indicated by step 234. If, however, in the step 236 it is determined that the confirmation tones have been received, the unit 190 in step 242 produces a control signal which it supplies via the control input 184 to the network 180 to cause the same to transmit a series of DTMF tones identifying both the location of the unit 20 and the condition reported, that is, a low battery condition. It will be appreciated that other data besides information indicating a low battery condition may be readily transmitted automatically in this fashion by the unit 20. For example, the operational state of a boiler at a customer's location which is serviced by a company having a receiving device, may be automatically transmitted via the unit 20 to the receiving device to indicate the need for service. The operational state can be reported for example, by replacing one of the actuators 30, 31 or 32 by a device which emits a single pulse when a condition to be notified occurs. Upon completion of data transmission, the unit 190 reestablishes an On-Hook condition, as indicated in step 234.

Figure 12:
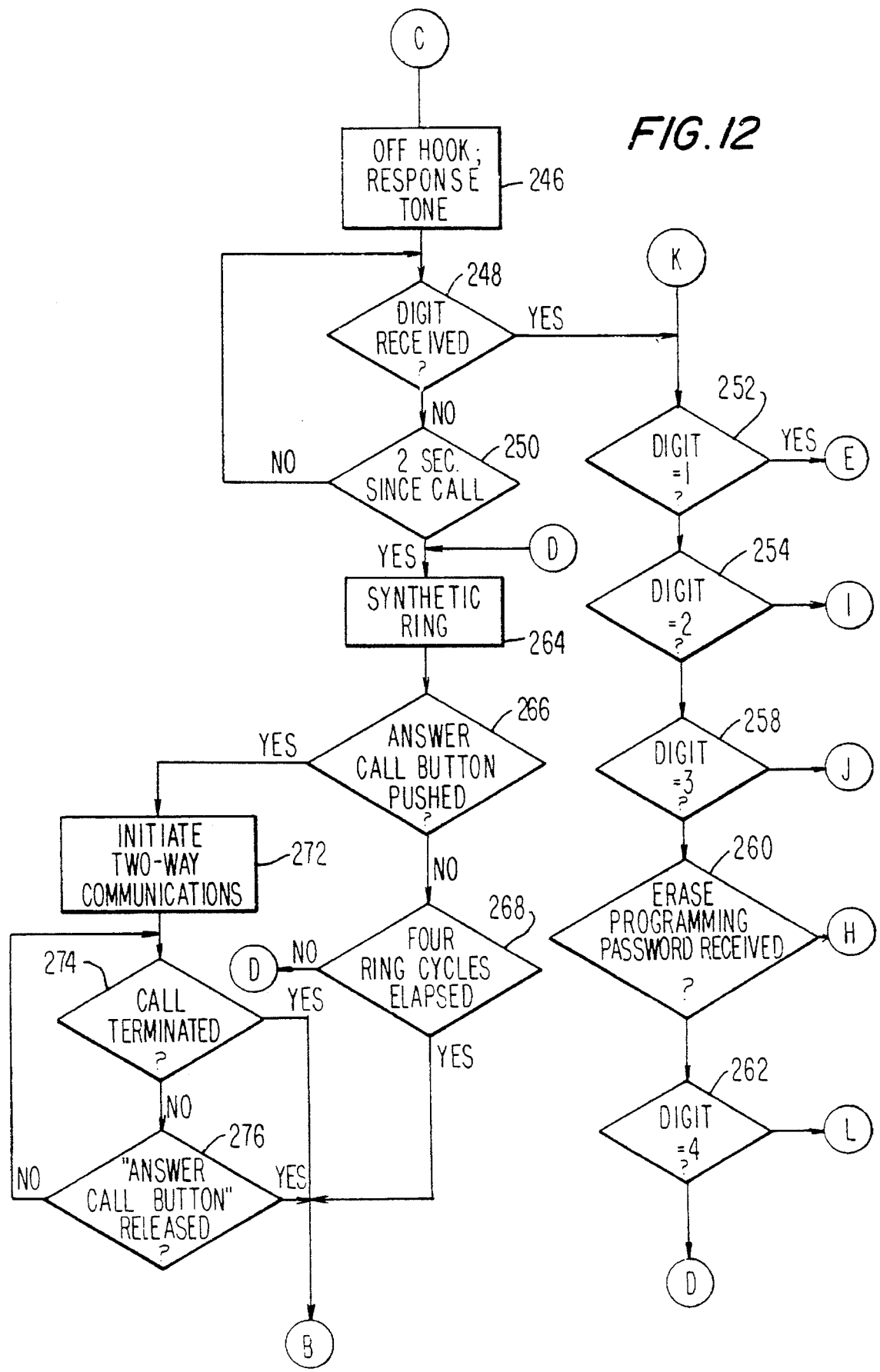
FIG. 12 is a flow chart illustrating an overall operation of the communications station when it receives an incoming call.

In the event that the unit 20 receives an incoming call request, the program branches to an incoming call receiving mode of operation illustrated in FIG. 12. In the incoming call receiving mode of operation, upon receipt of a ring signal via the telephone line 110, the input/output network 180 establishes an Off-Hook condition and produces a binary coded ring signal which it supplies to the unit 190 via the data output 186, followed by a response tone generated and transmitted by the network 180 via the telephone line 110 to the calling unit, as indicated in step 246 in FIG. 12. As explained in greater detail hereinbelow, six separate operational modes of the unit 20 may be initiated by a remotely located caller. The caller indicates the desired mode by transmitting one or more DTMF tones to the unit 20 after receipt of the unit's response tone. Accordingly, in step 248, the unit 190 determines whether at least one such digit has been received thereby. If not, the unit 190 next determines whether at least 2 seconds have elapsed since the call was received, as indicated in step 250. If it is determined in step 250 that 2 seconds have not yet elapsed, the unit 190 returns to step 248 once again to determine whether a digit has been received. This loop is repeated until either a digit is received or 2 seconds have elapsed.

In the event that a digit is received, the program branches to a series of decisional steps 252–262 for determining whether the received digit alone indicates one of four desired operational modes, each represented by a respective digit 1, 2, 3 or 4 in steps 252, 254, 258 and 262, respectively. In the event that one such digit is received, the program branches to a corresponding operational mode, as described in greater detail hereinbelow. In the alternative, it is determined in step 260 whether the first digit of an "erase programming" password has been received.

If none of the foregoing digits has been received, the program instead branches to a step 264 in which the unit 190 provides a control signal to the network 180 causing the same to generate a synthetic ring signal which it supplies as an output to the speaker 40 thus to signal to persons in the vicinity of the unit 20 that a remotely located caller wishes to establish voice communications. It will been from FIG. 12 that the step 264 is likewise entered in the event that a call is received but no digit is subsequently received within 2 seconds from the receipt of the call, as indicated in steps 248 and 250. Once the unit 190 has provided the synthetic ring control signal to the network 180, the unit 190 then proceeds to determine whether the answer push-button actuator 33 has been depressed by sensing the state thereof via the data input 200, as indicated in step 266. If the unit 190 then determines that the answer call button has not yet been pushed, it then determines whether four ring cycles have elapsed, as indicated in step 268, and if not, the program returns to steps 264 and 266 to continue the synthetic ring and determine whether the answer call button has been pushed.

In the event, however, that the answer call button 33 is not pushed before four ring cycles have elapsed, the program branches from step 268 to step 225 of the battery monitoring mode illustrated in FIG. 11. If, however, the answer call button is pushed before four ring cycles have elapsed, the program proceeds from the step 266 to a step 272 in which two-way communications are initiated under the control of the unit 190 which causes the network 180 to transmit sound signal produced by the microphone 42 over the telephone line 110 and to supply signals received therefrom to the speaker 40. As indicated in steps 274 and 276, two-way communications will be continued until either the calling party terminates the call or the answer call button 33 is released, whereupon the program branches to step 225 of the battery monitoring mode (FIG. 11).

Figure 13:
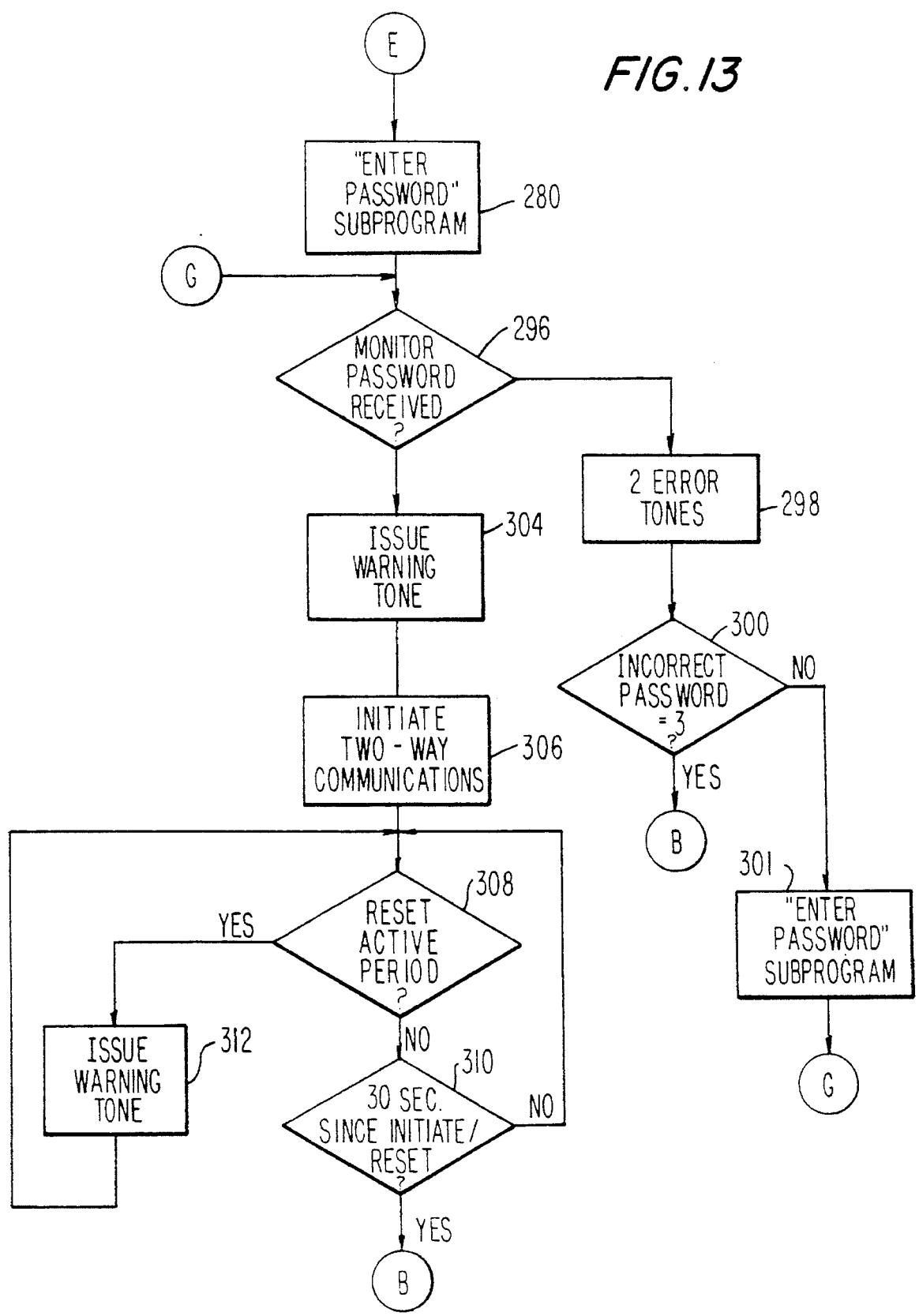
FIG. 13 is a flow chart illustrating a sequence of operations according to a monitoring mode in which the communications station carries out remote monitoring of sounds in its vicinity in response to an incoming call.
Figure 14:
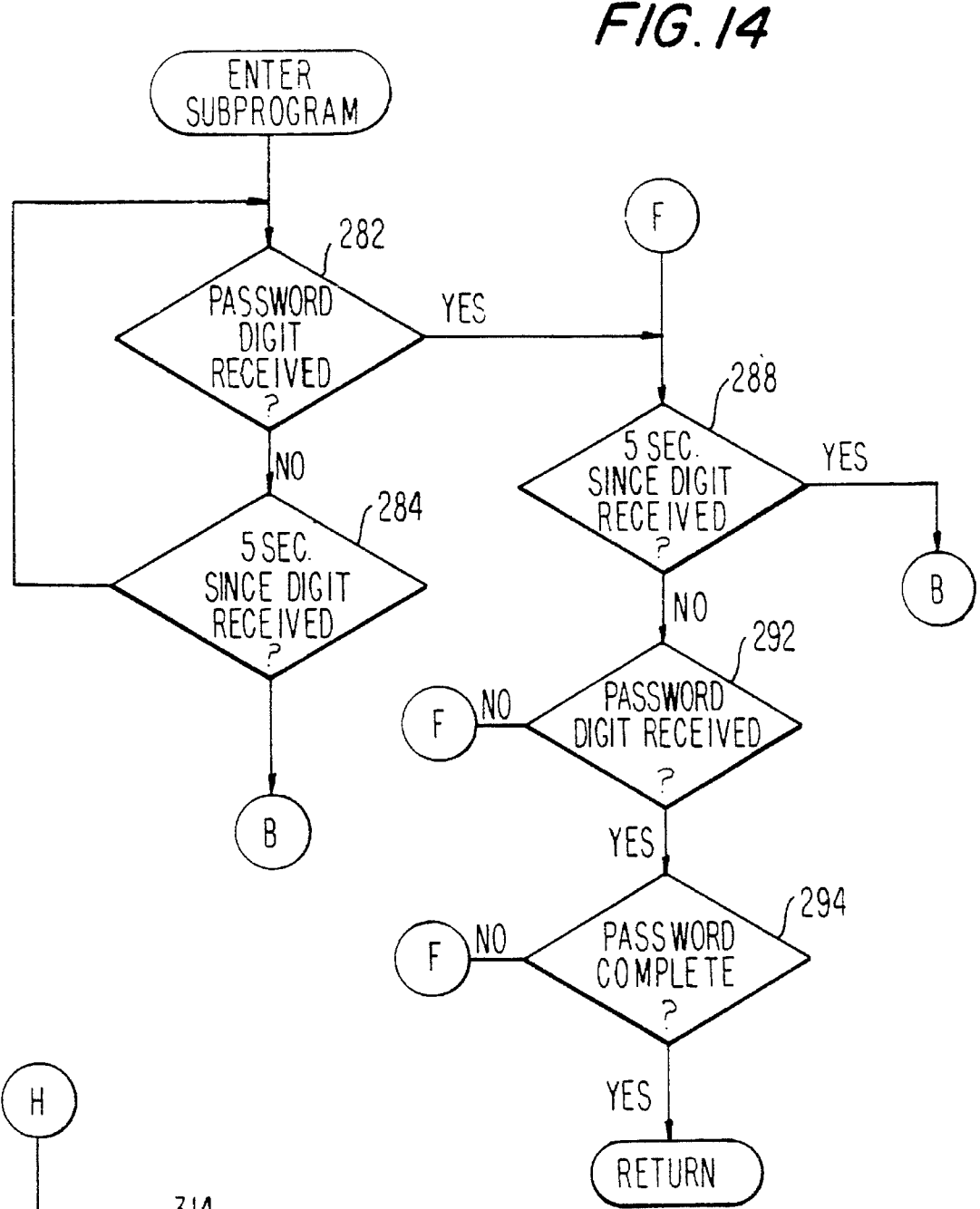
FIG. 14 is a flow chart of a subprogram carried out in the sequence illustrated in FIG. 13 and in following figures for entering a password transmitted by a remotely located user.

In the event that the caller transmits the digit 1 in DTMF format within 2 seconds after the call is received by the unit 20, the program branches via step 252 to a monitor mode of operation illustrated in FIG. 13. Referring to FIG. 13, in the monitor mode of operation in step 280 thereof, an "Enter Password" subprogram illustrated in FIG. 14 is first carried out in order to enter the password which the user must then transmit within a predetermined amount of time for the monitor mode to continue. In accordance with the "Enter Password" subprogram as illustrated in FIG. 14, the unit 190 first determines whether a password digit has been received, as indicated in step 282 and, if not, it is determined in step 284 whether 5 seconds have elapsed since the last digit was entered by the user. If not the program returns to step 282 to determine once again whether a digit has been received. Should 5 seconds elapse without the reception of any of the password digits, the program branches to step 225 of the battery monitoring mode (FIG. 11).

If, however, a first password digit has been received, the program then branches to a step 288 in which it is once again determined whether 5 seconds have elapsed since the next preceding digit was received. If so, the program branches to step 225 (FIG. 11). However, if 5 seconds have not yet elapsed, it is determined in step 292 whether a password digit has been entered. If not, the program returns to step 288. But if a password digit has been entered, the program proceeds from step 292 to step 294 in which the unit 190 determines whether the received password is then complete. In a preferred mode of operation, passwords of variable length are permitted and completion of the transmission of the password by the sender is indicated by the subsequent transmission of an appropriate DTMF tone, such as that produced by depressing the # sign on the telephone keypad. Accordingly, the unit 190 determines in step 294 whether the appropriate password complete DTMF signal has been received, indicating that the password is complete. If not, the program returns to the step 288 to determine whether 5 seconds have elapsed since reception of the next preceding digit.

If, however, the password complete signal has been received, the program returns to the sequence of steps indicated in FIG. 13, and in particular, to the step 296 wherein the unit 190 determines whether the received password corresponds with a monitor password previously stored in the EEPROM of the memory unit 192. If not, the unit 190 causes the network 180 to generate and transmit two error tones to the sender via the telephone line 110, as indicated in step 298. The unit 190 then determines whether three incorrect passwords have been received, as indicated in step 300. If so, the program branches to step 225 of FIG. 11. However, if in step 300 only one or two incorrect passwords have then been received, the program returns to the "Enter Password" subprogram (step 301) to permit the user to enter another password.

In the event, however, that the correct monitor password has been received as determined in the step 296 of FIG. 13, the unit 190 issues a control signal to the network 180 causing it to generate a warning tone which it then supplies to the speaker 40 to produce a audible sound in the vicinity of the unit 20 to warn anyone at that location that sounds are being monitored by the unit 20 (step 304). In step 306, the unit 190 initiates two-way communications without requiring that the answer-call button 33 be depressed. Thereafter a 30 second active monitoring period commences during which the caller is permitted to monitor sounds in the vicinity of the unit 20 without depression of the answer-call button. The 30 second active period may be recommenced by the transmission of an appropriate control signal to the unit 20 via the telephone line 110. Accordingly, in a step 308 it is determined whether such a signal has been received, and if so, the program branches to a step 312 in which the warning tone is once again issued and the program returns to the step 308. If the active period has not been reset or, if reset, the warning tone has already been issued, the program proceeds from the step 308 to the step 310 in which it is determined whether 30 seconds have elapsed since the active monitoring period was initiated or reset. If not, the program returns to the step 308 to once again determine whether the active period has been reset. If, however, the 30 second interval has elapsed, the program branches to step 225 (FIG. 11).

Figure 15:
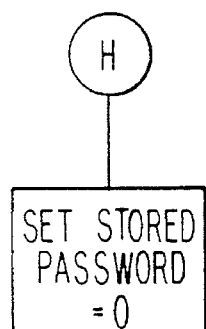
FIG. 15 is a flow chart of a sequence of operations in which the communications station erases a stored programming password in response to an incoming call placed by a remotely located user.
Figure 16:
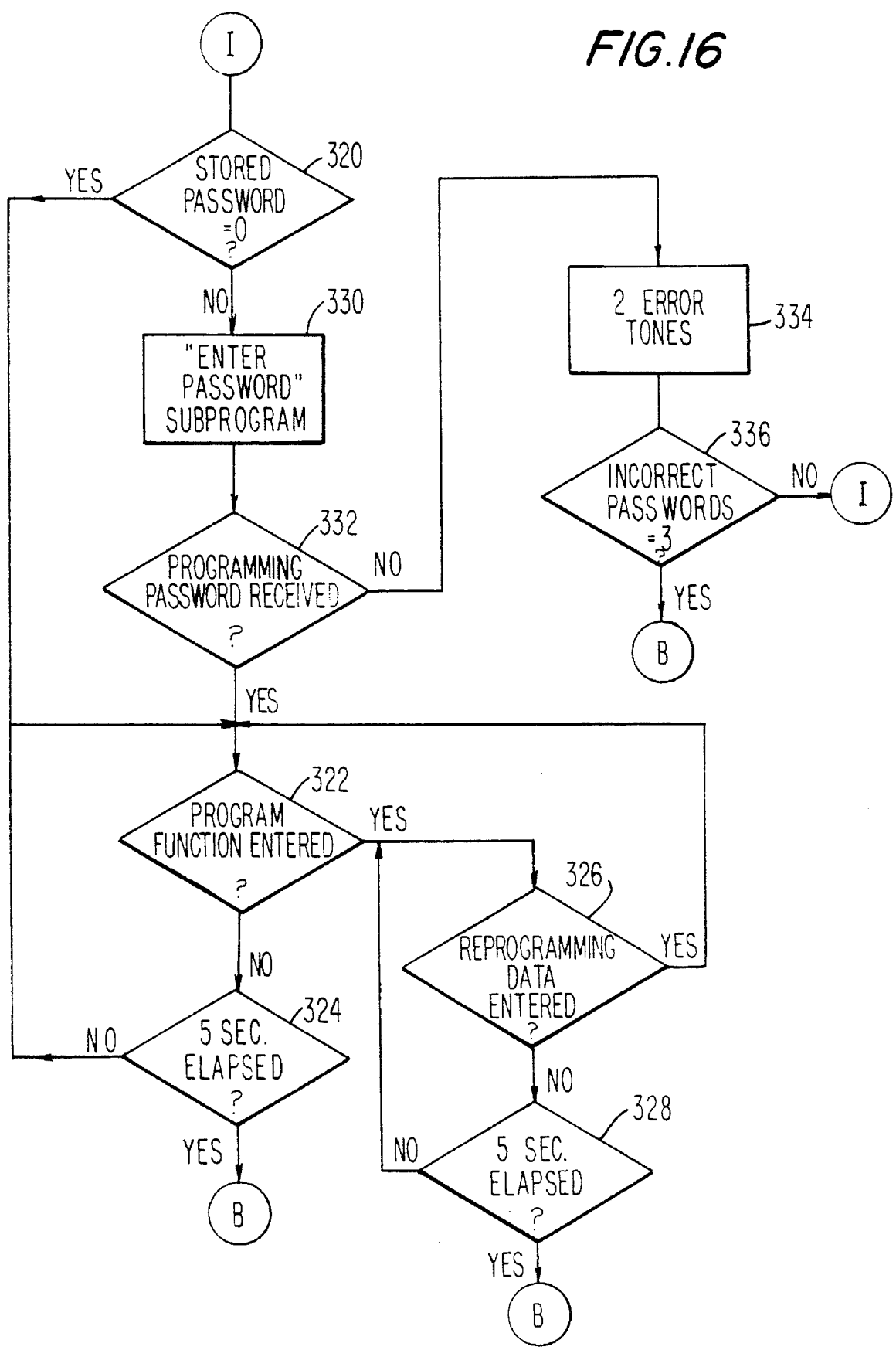
FIG. 16 is a flow chart illustrating a sequence of operations according to a programming mode in which the communications station is reprogrammed in response to an incoming call placed by a remotely located user.

Referring again to FIG. 12, if the erase programming password is received after an incoming call has been established, the program in step 260 branches to an erase programming password mode of operation which is illustrated in FIG. 15. Referring to FIG. 15, upon receipt of the erase programming password by the unit 20, a programming password previously stored in the EEPROM of the memory block 192 is automatically reset to 0, as indicated in step 314, and the program branches to step 225 of FIG. 11. It will be appreciated from the discussion below that the possession of the programming password permits one to reprogram any of the passwords stored in the memory block 192 as well as to change the various telephone number data stored therein. Accordingly, should an authorized user lose the programming password, it is then possible to reset the previously stored programming password to 0 in the mode of FIG. 15 so that authorized users may reestablish the programming password pursuant to a programming mode of operation explained below in connection with FIG. 16.

To access the programming mode, a remotely located caller calls the unit 20 so that the program branches first to the incoming call mode illustrated in FIG. 12. Upon receipt of the response tone, the caller enters the digit 2 within two seconds, whereupon the program branches to step 320 of FIG. 16. In step 320, it is determined whether the stored password is equal to 0, that is, whether the erase programming password mode illustrated in FIG. 15 has been carried out and the programming password stored in the EEPROM has not yet been reprogrammed. If so, the program branches to a step 322 in which it is determined whether the caller has selected a program function by transmitting one of ten different DTMF tones. For example, the transmission of DTMF tones representing the digits 1–3 may represent an intention to change the preprogrammed telephone number stored in the EEPROM which is read out when a corresponding one of the push-button actuators 30, 31 and 32 is depressed by the user. Transmission of the tones representing the digits 4 and 5 may represent an intention to change the stored programming and monitor passwords, respectively, while transmission of the tones representing the digits 6 and 7 may indicate an intention to change a remote actuation password and a data transfer password, respectively, explained in greater hereinbelow. Accordingly, additional passwords and telephone numbers may be stored, if desired, by transmitting tones representing the digits 8, 9 or 0, which in effect instructs the unit 20 in which storage location of the EEPROM the transmitted data is to be stored. If, however, the program function has not yet been transmitted by the caller, the program branches to a step 324 in which it is determined whether 5 seconds have elapsed since the step 322 was first entered. If not, the program returns to step 322; if so, the program branches to step 225 (FIG. 11).

If the program function digit is transmitted by the user within 5 seconds after the program enters the step 322, the program branches to a step 326 in which it is determined whether the reprogramming data to be stored in the corresponding memory location of the EEPROM has been entered. If not, it is determined in step 328 whether 5 seconds have elapsed since the last digit was received by the unit 20. If so, the program once again branches to step 225 of FIG. 11. If not, the program returns to the step 326 for a further determination. Once the reprogramming data has been received, the program branches from step 326 again to step 322 to determine if a new programming function has been entered by the user. It will be appreciated, therefore, that the program will repeat steps 322 and 326 so long as data continues to be entered such that no more than 5 seconds elapses between the transmission of each digit thereof.

If in the step 320 it is determined that the stored password is not equal to zero, the program branches to a step 330 in which the "Enter Password" subprogram of FIG. 14 is carried out. Upon returning from the "Enter Password" subprogram, it is determined in a step 332 whether the correct programming password has been received. If so, the program branches to step 322 to carry out reprogramming, as described above. If, however, in step 332 it is determined that the correct programming password has not been received, the unit 190 causes the network 180 to transmit two error tones, as indicated in step 334, after which it is determined in step 336 whether three incorrect passwords have been received, in which case, the program once again branches to the step 225 of FIG. 11. If not, the program returns to step 320 and the caller is given a further opportunity to enter a password.

Figure 17:
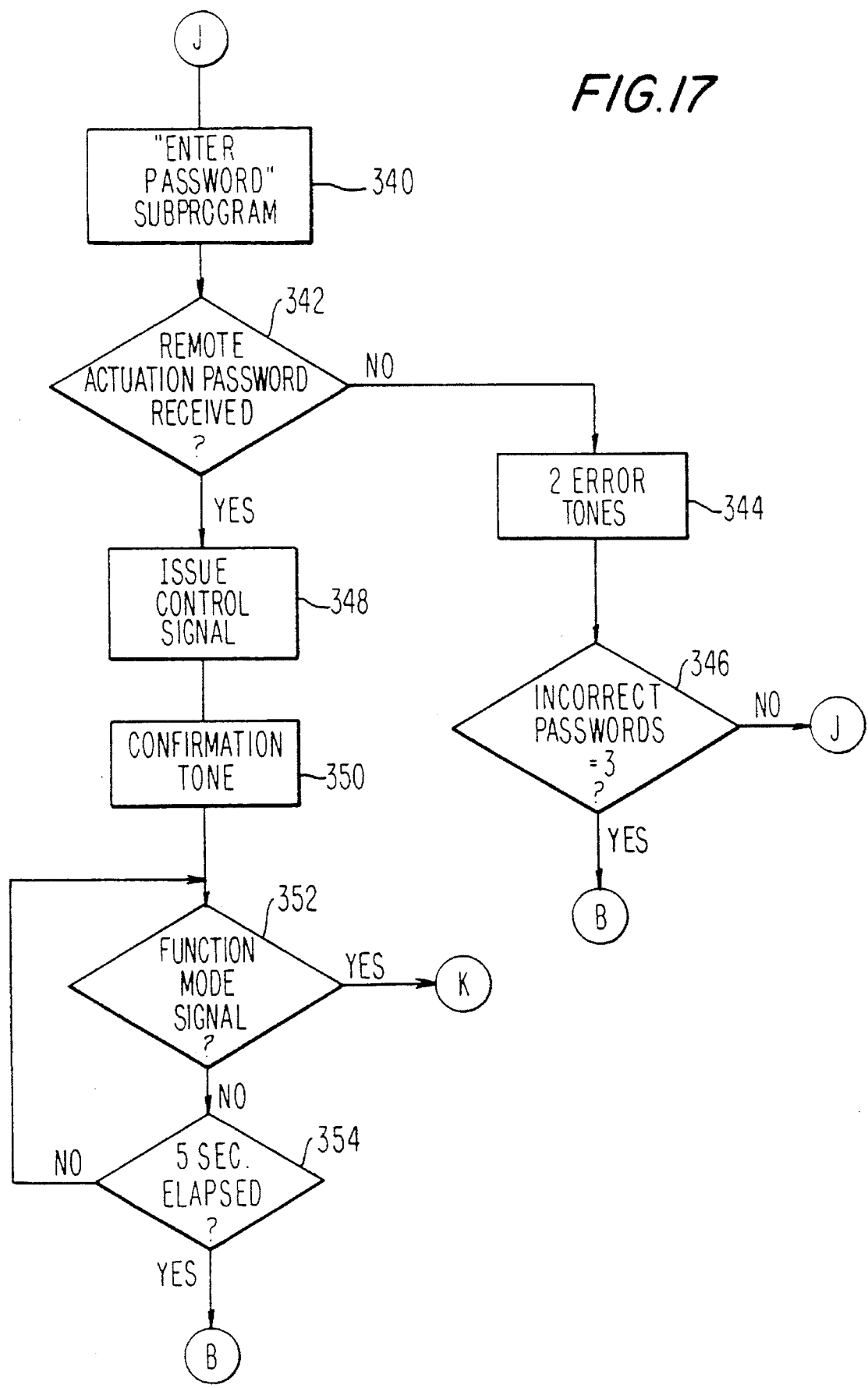
FIG. 17 is a flow chart of a sequence of operations according to a remote actuation mode in which the communications station generates a control signal for operating auxiliary apparatus in response to an incoming call placed by a remotely located user.

Referring again to FIG. 12, if an incoming call is received and the caller transmits the digit 3 within two seconds after the call is initiated, the program branches in step 258 to a step 340 in FIG. 17 for carrying out the "Enter Password" subprogram illustrated in FIG. 14. Once the password has been entered by the caller, it is determined in a step 342 whether a correct remote actuation password has been received. If not, the program branches to a step 344 in which the unit 190 causes the network 180 to transmit two error tones and the program branches to a step 346 in which it is determined whether three incorrect passwords have already been received. If so, the program branches to step 225 of FIG. 11. If not, however, the program returns to step 340 to permit the caller to enter a further password.

If, however, in step 342 it is determined that the correct remote actuation password has been received the program branches to 348 in which the unit 190 issues a control signal to supply power from the battery momentarily to the options relay 204. The options relay 204 is a latching relay, so that a brief pulse of power from the battery 206 serves to switch the state of the options relay 204 in a power efficient manner, thus to conserve the battery 206. Once this is accomplished, the unit 190 causes the network 180 to transmit a confirmation tone to the caller to confirm that the control signal has been issued, as indicated by a step 350. Once the confirmation tone has been transmitted, it is determined in a following step 352 whether a new function mode signal has been received, and if so, the program branches to step 252 in FIG. 12 for determining which function has been requested by the caller. If not, it is determined in a step 354 whether 5 seconds have elapsed since the confirmation tone was transmitted in step 350. If not, the program returns to step 352; if so, the program branches to step 225 of FIG. 11.

When an incoming call is received and it is determined in step 262 of FIG. 12 that the caller has transmitted the digit 4 to indicate the desired mode of operation, the program branches to a step 360 in FIG. 18 to carry out a data transmission operation for transmitting data previously stored in the EEPROM. Such information may include, for example, data indicating the number of calls made from the unit arranged in accordance with the individual telephone numbers called thereby as indicated by selection of the push-button actuators 30, 31 and 32. Such data may be useful for gathering statistics concerning the use of emergency services or to verify information gathered separately. For example, one of the buttons 30, 31 or 32 may be preprogrammed to permit a public parking lot patron to contact a private towing service for assistance. If the private towing company pays a usage fee to the owner of the public parking lot, statistics indicating the number of such calls placed can verify the amount of the usage fee due to the owner of the parking lot.

In step 360 of FIG. 18, the "Enter Password" subprogram is carried out to permit the caller to enter the appropriate password for accessing the mode of operation. In step 362, it is determined whether the correct data transmission password has been received. If not, the unit 190 causes the network 180 to transmit two error tones as indicated in step 364 and it is determined in a step 366 whether three incorrect passwords have been received. If so, the program branches to the step 225 of FIG. 11; if not, the program returns to step 360 to permit the caller to transmit a new password. If, however, the correct data transmission password has been received, the program branches from step 362 to a step 370 in which the unit 190 causes the network 180 to transmit a confirmation tone to the caller and then, in a step 372, causes the network 180 to transmit the requested data. Once data transmission is completed, the program once again branches to the step 225 of FIG. 11.

The terms and expressions which have been employed are used as terms of description and not limitation, and there is no intention in the use of such terms and expressions of excluding any equivalents of the features shown and described or portions thereof, it being recognized that various modifications are possible within the scope of the invention.

What is claimed is:

1. A vandal-resistant push-button actuator, comprising: a push-button defining a push-button axis; a push-button mounting means having a passageway therein for slidably receiving the push-button therein coaxially therewith; and means for forming first and second axially spaced apart, slidable seals between the push-button and the passageway of the push-button mounting means therefore, providing protection against invasion by foreign substances or foreign objects.

2. The vandal-resistant push-button actuator of claim 1, further comprising a lubricant disposed between the first and second axially spaced apart slidable seals.

3. The vandal-resistant push-button actuator of claim 2, wherein the lubricant comprises a synthetic grease.

4. The vandal-resistant push-button actuator of claim 1, further comprising an adhesion inhibiting fluid disposed between the first and second axially spaced apart slidable seals.

5. The vandal-resistant push-button actuator of claim 4, wherein the adhesion inhibiting fluid comprises a synthetic grease.

6. The vandal-resistant push-button actuator of claim 1, wherein the means for forming the first and second axially spaced apart, slidable seals comprises a first O-ring disposed between the push-button and the passageway of the push-button mounting means; and a second O-ring spaced axially from the first O-ring and disposed between the push-button and the cylindrical passageway of the push-button mounting means.

7. The vandal-resistant push-button actuator of claim 6, wherein the push-button is provided with first and second circumferentially extending, axially spaced apart grooves therein; and wherein each of the first and second O-rings is disposed in a respective one of the grooves such that the first and second O-rings are carried with the push-button.

8. The vandal-resistant push-button actuator of claim 1, further comprising switching means for changing a state of operation thereof in response to motion of the push-button with respect of the push-button mounting means.

9. The vandal-resistant push-button actuator of claim 1, wherein the push-button is slidably movable within a predetermined range of the passageway and wherein the means for forming first and second axially spaced apart slidable seals provide a continuous seal between the push-button and the passageway throughout movement of the push-button within the predetermined range.

10. A vandal-resistant push-button actuator, comprising: a push-button defining a push-button axis; push-button mounting means having a passageway therein for slidably receiving the push-button therein; first resilient means disposed between the push-button and the passageway of the push-button mounting means for resiliently absorbing a force applied to the push-button in a direction transverse to the push-button axis; and second resilient means disposed between the push-button and the passageway spaced apart from the first resilient means for resiliently absorbing a force applied to the push-button in a direction transverse to the push-button axis.

11. The vandal-resistant push-button actuator of claim 10, wherein the first and second resilient means each comprise a resilient O-ring disposed between the push-button and the passageway of the push-button mounting means.

12. The vandal-resistant push-button actuator of claim 10, wherein the push-button is slidable within the passageway in the direction of the push-button axis and wherein the first and second resilient means are spaced apart in the direction of the push-button axis.

13. The vandal-resistant push-button actuator of claim 12, wherein the push-button has a portion projecting axially from an end of the passageway to afford user access to the projecting portion whereby the first and second resilient means are operative to absorb axially transverse forces to which the projecting portion is subjected by a vandal.

14. A vandal-resistant push-button actuator, comprising: a push-button; push-button mounting means having a passageway therein for slidably receiving the push-button therein; a lubricant between the push-button and the passageway; and means for confining the lubricant between the push-button and the passageway.

15. The vandal-resistant push-button actuator of claim 14, wherein the lubricant comprises a synthetic grease.

16. A vandal-resistant push-button assembly, comprising: a sleeve and escutcheon member having a sleeve end extending in a first direction and an escutcheon end extending in a second direction opposite the first direction, the escutcheon end having a generally conical first surface facing in the second direction and a second surface facing in the first direction for abutting an outer surface of a mounting plate; a push-button having a push-button head and a shaft; the sleeve and escutcheon member having a central aperture therethrough extending along an axis thereof, the shaft of the push-button being slidably mounted in the central aperture; the push-button head having a convex outer surface facing in the second direction and extending outwardly of the conical first surface of the escutcheon end; the conical first surface of the escutcheon end forming an angle with a plane transverse to the axis of the sleeve and escutcheon member which is smaller than an angle formed between a tangent to the convex outer surface of the push-button head adjacent the conical first surface of the sleeve and escutcheon member and the plane.

17. A vandal-resistant push-button actuator, comprising: a push-button; push-button mounting means having a passageway therein for allowing slidable movement of the push-button therein coaxially therewith; and first and second axially spaced apart seals fixed to the passageway so as to respectively form first and second seals between the push-button and the passageway.

18. The vandal-resistant push-button actuator of claim 17, wherein said first and second seals provide a continuous seal between the push-button and the passageway throughout the movement of the push-button.

19. The vandal-resistant push-button actuator of claim 18, wherein the push-button defines a push-button axis and wherein said first and second seals resiliently absorb a force applied to the push-button in a direction transverse to the push-button axis.

* * * * *